(12) United States Patent  
Parker

(10) Patent No.: US 8,919,697 B2  
(45) Date of Patent: Dec. 30, 2014

(54) STRUCTURAL ASSEMBLY FOR AN AIRCRAFT

(75) Inventor: Simon John Parker, Bristol (GB)

(73) Assignee: Airbus Operations Limited, Bristol (GB)

( * ) Notice: Subject to any disclaimer, the term of this patent is extended or adjusted under 35 U.S.C. 154(b) by 779 days.

(21) Appl. No.: 13/067,212

(22) Filed: May 17, 2011

(65) Prior Publication Data

US 2011/0284687 A1  Nov. 24, 2011

(30) Foreign Application Priority Data

May 17, 2010  (GB) .................................. 1008186.7

(51) Int. Cl.
- *B64C 1/00* (2006.01)
- *B64C 1/26* (2006.01)
- *B64C 3/20* (2006.01)
- *B64C 3/26* (2006.01)

(52) U.S. Cl.
CPC ... *B64C 3/26* (2013.01); *B64C 1/26* (2013.01); *B64C 3/20* (2013.01)
USPC .................................... 244/123.1; 244/123.3

(58) Field of Classification Search
USPC .......................... 244/123.1, 123.3, 123.7, 131
See application file for complete search history.

(56) References Cited

U.S. PATENT DOCUMENTS

| | | | | |
|---|---|---|---|---|
| 4,749,155 A * | 6/1988 | Hammer et al. | ............ | 244/123.7 |
| 6,808,143 B2 * | 10/2004 | Munk et al. | ................. | 244/123.1 |
| 7,681,835 B2 * | 3/2010 | Simpson et al. | ............ | 244/123.3 |
| 7,740,202 B2 * | 6/2010 | Namaizawa et al. | ....... | 244/123.1 |
| 8,186,622 B2 * | 5/2012 | Munday | ......................... | 244/132 |
| 8,523,111 B2 * | 9/2013 | Williams | .................... | 244/123.1 |
| 2010/0170989 A1 * | 7/2010 | Gray | ........................... | 244/123.1 |
| 2012/0104168 A1 * | 5/2012 | Latorre Plaza et al. | ..... | 244/123.1 |
| 2013/0099058 A1 * | 4/2013 | Payne et al. | ................. | 244/123.1 |

FOREIGN PATENT DOCUMENTS

WO    WO 2008/110835    9/2008

OTHER PUBLICATIONS

Search Report for GB 1008186.7, dated Aug. 2, 2010.

* cited by examiner

*Primary Examiner* — Christopher P Ellis  
(74) *Attorney, Agent, or Firm* — Nixon & Vanderhye P.C.

(57) ABSTRACT

A structural assembly for an aircraft comprising a cover with outer and inner faces, an inner support element and urging means on the inner support element, wherein opposing edges of the cover are fixedly mounted relative to the inner support element, and the urging means acts on the inner face of the cover to urge the cover to distend outwardly and locate in a predetermined position. Another aspect of the invention relates to a method of forming a structural assembly for an aircraft comprising an cover with outer and inner faces, an inner support element and urging means on the inner support element, the method comprising the steps of fixedly mounting opposing edges of the cover relative to the inner support element and operating the urging means to act on the inner face of the cover so that the cover is urged to distend outwardly into a predetermined position.

39 Claims, 20 Drawing Sheets

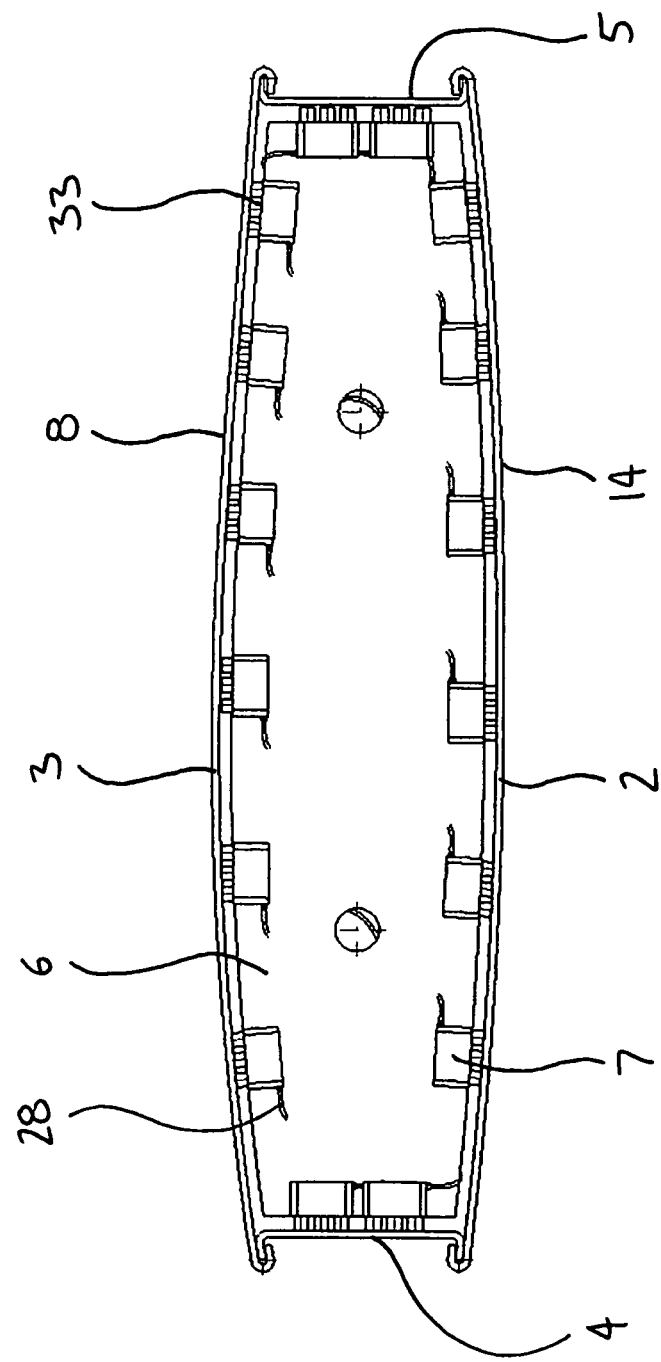

STRUCTURAL ASSEMBLY FOR AN AIRCRAFT

This application claims priority to GB Patent Application No. 1008186.7 filed 17 May 2010, the entire contents of which is hereby incorporated by reference.

INTRODUCTION

The present invention relates to a structural assembly for an aircraft. The present invention also relates to a method of forming a structural assembly for an aircraft.

BACKGROUND

Aircraft are generally formed from a number of structural assemblies. Each assembly comprises a number of components conventionally mounted to each other using mechanical fixtures which extend through holes formed in the components, such as rivets or bolts. The components used to form a structural assembly for an aircraft include spars, ribs, skin, gunnels, compression struts and stringers.

The structure of a modern aircraft wing generally includes a main structural component referred to as a wing box that carries the main structural and aerodynamic loadings applied to the wing, as well as functioning to join the wing to the aircraft fuselage. The wing box generally includes at least a front and rear longitudinal spar with a number of lateral ribs connected between the front and rear spars over which covers or panels are mounted. In addition to the wing box the aircraft wing generally includes deployable aerodynamic devices including flaps, located along the trailing edge of the wing, and slats, located along the leading edge of the wing. Other structural assemblies for an aircraft include leading and trailing edges of a wing, horizontal tail planes (HTPs), Vertical Tail Planes (VTPs) and the fuselage.

In such a wing box assembly, the spars are generally fixedly mounted to the ribs and then covers or panels are located and flexed over the ribs and fixedly mounted to said spars and ribs using conventional mechanical fixtures such as rivets or bolts received in pre-formed holes in said panels, spars and/or ribs. However, there are a number of known problems with using such conventional assembly methods and the resulting structural assembly.

Although conventional mechanical fixtures securely connect two or more components, they cause localised stress concentrations of the area proximal to their mounting holes which may lead to the fixtures failing, and cause, for example, fuel leakage or overall breakdown of the aircraft. Furthermore, conventional structural assemblies and the components used in their assembly are generally formed from a metallic material, such as an aluminium sheet, castings or extrusions, and so this can cause electrical failure or ignition of the fuel held in the fuel tank, if the aircraft is struck by lightening and conducted through the metallic components.

To address the problems referred to above, it is known to employ carbon fibre materials, which also have certain weight, strength and fatigue advantages over their metallic counterparts. However, components used in forming assemblies for aircraft are required to be formed to exact tolerances to ensure that, when the components are abutted against each other and fastened together using conventional mechanical fixtures, the outer mould line of the aircraft assembly is formed to an exact tolerance. One issue with open moulded carbon fibre composite materials is that although one surface is generally produced to exact tolerances, the opposing surface is generally of low tolerance, typically up to 4%. With a conventional low volume aircraft manufacture there is the opportunity to modify or shim components to obtain the exact tolerances needed, however there is a desire to achieve a high speed automated assembly process conducive for high volume manufacture, and so conventional techniques for assembling structural assemblies for aircraft would lead to a large amount of wastage and scrap due to components not meeting the required tolerances and the requirement for X, Y, Z compound angle post machining.

A further problem with conventional techniques for assembling structural assemblies for aircraft, in particular, but not exclusively, wingboxes is that conventionally a flatter than required cover is pulled down on to curved ribs, and so build stresses are imparted on the assembly that increase towards the front and rear spars and effectively try to disassemble the structure. The fixing point stresses therefore increase with wing bend and fuel loads therefore fixings and fixing points are then required to be sized for all these conditions which increases their size and weight.

The present invention therefore seeks to provide a method of forming a structural assembly for an aircraft which substantially overcomes or alleviates the above problems and to provide a structural assembly for an aircraft formed by such a method.

SUMMARY OF THE INVENTION

According to the invention, there is provided a structural assembly for an aircraft comprising a cover with outer and inner faces, an inner support element and urging means on the inner support element, wherein opposing edges of the cover are fixedly mounted relative to the inner support element, and the urging means acts on the inner face of the cover to urge the cover to distend outwardly and locate in a predetermined position.

Preferably, the urging means is in an extended position when the urging means acts on the inner face of the cover and the urging means is configured to fixedly locate in said extended position.

Conveniently, the urging means extends from said inner support element to act on the inner face of the cover.

Advantageously, the opposing edges of the cover are fixedly mounted to corresponding end support elements.

In one embodiment, each end support element is mounted on the inner support element.

Preferably, the urging means is a first urging means and the structural assembly further comprises second urging means, said second urging means being configured to act on each end support element to urge each end support element outwardly into a predetermined position.

The second urging means may be configured to urge each end support element into communication with the corresponding opposing edge of the cover to fixedly mount the cover thereto.

Each opposing edge of the cover may be turned back on itself along said each edge to form a recess. Each end support element may have a flange extending along an edge to locate in said recess to fixedly mount the cover to said end support element.

The structural assembly may further comprise adhesive in said recess.

Preferably, the end support elements are spars.

Conveniently, the inner support element is a rib. The structural assembly may further comprise a plurality of ribs spaced from each other.

Advantageously, the structural assembly further comprises two covers spaced from each other with the inner support element disposed therebetween.

In one embodiment, the end support elements extend between corresponding edges of the opposing covers.

The end support elements may extend substantially transverse to the covers.

Advantageously, the structural assembly according may further comprise two urging means on opposite sides of the inner support element, so that each cover is urged to distend outwardly away from each other.

Preferably, the panel is formed from cured carbon fibre.

Conveniently, the urging means fixedly mounts to the cover.

In a preferred embodiment, the urging means comprises a plurality of urging elements spaced from each other along the inner support element.

In a convenient embodiment, each urging element comprises a body with a cylinder and a hydraulically activated piston slidably received in said cylinder which is urged from said cylinder and acts against the inner face of the cover to urge the cover to distend outwardly.

A hydraulic fluid may be injected into the urging element to urge the piston against the inner face of the cover.

The hydraulic fluid may be settable to fixedly locate the piston in an expanded position Preferably, the urging elements are hydraulically connected in series so that each piston applies the same hydraulic pressure to the cover.

Conveniently, the second urging means comprises a plurality of second urging elements spaced from each other along the inner support element.

Advantageously, each second urging element comprises a body with a cylinder and a hydraulically activated piston slidably received in said cylinder which is urged from said cylinder and acts against said end support element.

Preferably, the outer face of the cover forms an outer mould line of the structural assembly.

According to another aspect of the invention, there is provided a wing box for an aircraft comprising a structural assembly with a cover with outer and inner faces, an inner support element and urging means on the inner support element, wherein opposing edges of the cover are fixedly mounted relative to the inner support element, and the urging means acts on the inner face of the cover to urge the cover to distend outwardly and locate in a predetermined position.

According to another aspect of the invention, there is provided a method of forming a structural assembly for an aircraft comprising an cover with outer and inner faces, an inner support element and urging means on the inner support element, the method comprising the steps of fixedly mounting opposing edges of the cover relative to the inner support element and operating the urging means to act on the inner face of the cover so that the cover is urged to distend outwardly into a predetermined position.

Preferably, the method further comprises the step of fixing the urging means in an extended position, so that the urging means is acting on the inner face of the cover and the cover is distended outwardly in said predetermined position.

Advantageously, the method further comprises the step of disposing the outer face of the cover on a mould tool which has a locating surface corresponding to a desired predetermined shape of the outer face of the cover so that, when the cover is urged to distend outwardly, the outer face of the cover abuts the locating surface and assumes said desired predetermined shape.

Conveniently, the method further comprises the step of mounting a removable tooling to mount the inner support element in spaced relation from said locating surface of the mould tool tooling through an aperture in the cover, mounting the tooling to the mould tool and locating said inner support element to the tooling so that the inner support element and cover are disposed in a predetermined spaced relation to each other.

The method may further comprise the step of fixedly mounting an end support element to each opposing edge of the cover.

Preferably, the method further comprises the step of fixedly mounting each end support element to the inner support element to fixedly mount the opposing edges of the cover relative to the inner support element.

The urging means may be a first urging means and a second urging means may be on the inner support element, and the method may further comprise the step of the second urging means acting on each end support element and urging each end support element outwardly into a predetermined position to fixedly mount said each end support element to each opposing edge of the cover.

The structural assembly may include two covers, and the method conveniently further comprises the steps of locating the covers in spaced relation to each other with the inner support element disposed therebetween, fixedly mounting opposing edges of each cover to the end support element so that said each end support element extends between the two covers and operating the urging means to act on the inner face of each cover so that the covers are urged to distend outwardly away from each other into predetermined positions.

Advantageously, the method further comprises the step of disposing the outer face of each cover to face a corresponding mould tool which has a locating surface corresponding to a desired predetermined shape of the outer face of each cover so that, when each cover is urged to distend outwardly, the outer face of each cover abuts the locating surface and the outer surface of each cover assumes said desired predetermined shape.

Preferably, the method further comprises the step of mounting a removable tooling to one of said mould tools to mount the inner support element in spaced relation from said locating surface of each mould tool said locating surface of each mould tool tooling through an aperture in the cover, mounting the tooling to the mould tool and locating said inner support element to the tooling so that the inner support element and cover are disposed in a predetermined spaced relation to each other and a uniform pressure is applied to both covers by the urging means.

BRIEF DESCRIPTION OF THE DRAWINGS

Embodiments of the invention will now be described, by way of example only, and with reference to the accompanying drawings, in which:

FIG. 20 is an elevational view of an assembled wing box for an aircraft.

DESCRIPTION OF THE PREFERRED EMBODIMENTS

Figure 1:
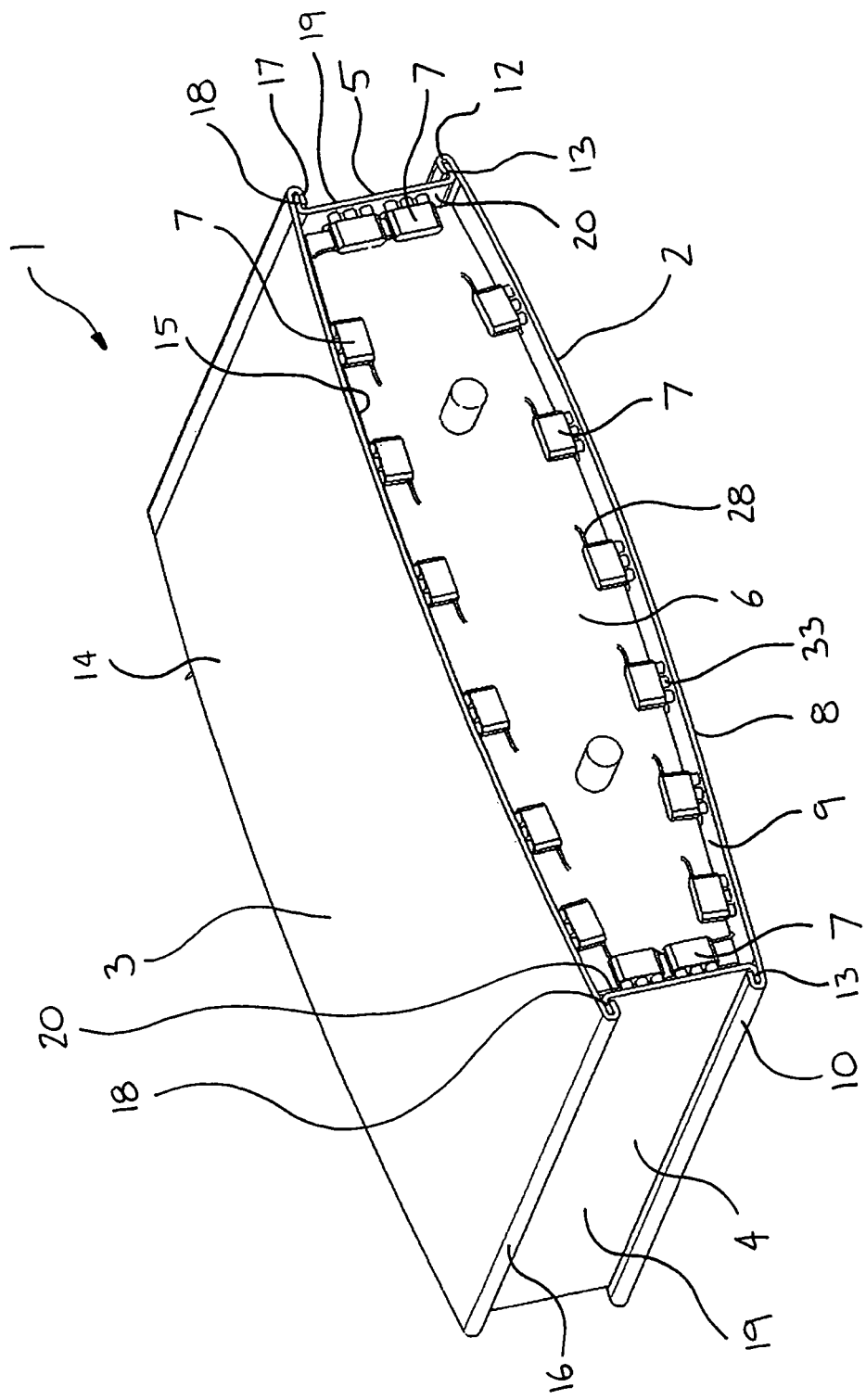
FIG. 1 is a perspective view of a wing box for an aircraft.

Referring now to the drawings, a wing box 1 for an aircraft is shown in FIG. 1. The wing box 1 is one of the main structural assemblies of an aircraft wing that carries the main structural and aerodynamic loadings applied to the wing, as well as functioning to join the wing to the aircraft fuselage. In addition, further assemblies are aligned therewith and connected thereto to form the wing of an aircraft. For example, leading and trailing edges (not shown) are attached to front and rear ends of said wingbox respectively and outer wing sections are connected to ends of the wing box. In the following exemplary embodiments, the present invention is described in relation to a wing box and the components assembled to form a wing box, however it will be appreciated that the present invention may relate to assemblies for an aircraft, and may also relate to assemblies for alternative uses, for example in the automobile industry, and so is not limited to aircraft production.

The structural assembly of a wing box 1 shown in FIG. 1 comprises a lower cover 2, an upper cover 3, front and rear longitudinal spars 4,5 which each extend between the upper and lower covers 2,3, and a number of laterally extending ribs 6 which extend between each of the lower and upper covers 2,3, and the spars 4,5. The front and rear longitudinal spars 4,5 resist bending and twisting loads and the shearing loads are taken on by the upper and lower covers 2,3.

A plurality of hydraulic expand and set cylinder arrays or urging elements 7 are mounted around the periphery of each rib 6 and act as urging means to urge and fixedly locate the front and rear spars 4,5, the lower and upper covers 2,3, and the ribs 6 with respect to each other when the wing box is assembled, as will be explained in detail hereinafter.

The lower and upper covers 2,3 form the outer skin of the wing box and each comprise a sheet of carbon fibre reinforced plastic formed from a series of plies of uni-axial carbon fibre overlaid on each other.

The lower cover 2 has an outer surface 8 and an inner surface 9. The outer surface 8, which in the case of a wing box forms part of the outer surface of the wing, is finished to a high tolerance, with the tolerance of the inner surface 8 being less important, and generally finished to a lower tolerance, for example +/−4%. Prior to assembly of the wing box, the lower cover 2 is cured in an initial configuration with the outer surface 8 being formed to have a flatter than finally desired shape.

Front and rear edges 10,12 of the lower cover 2 are folded back on themselves over a portion of the inner surface 9 to form elongate longitudinally extending recesses which are each arranged to receive a corresponding elongate lower flange 13 longitudinally extending along lower edges of the front and rear spars 4,5, as will be described hereinafter. A tool receiving aperture 11 is formed through the lower cover between the outer and inner surfaces 8,9 (refer to FIG. 6). It will be understood that the tool receiving aperture 11 may also be used in a conventional manner for in service inspections.

The upper cover 3 has an outer surface 14 and an inner surface 15. The outer surface 14, which in the case of a wing box forms part of the outer surface of the wing, is finished to a high tolerance, with the tolerance of the inner surface 15 being less important, and generally finished to a lower tolerance, for example +/−4%. Prior to assembly of the wing box, the upper cover 2 is cured in an initial configuration with the outer surface 14 being formed to have a flatter than finally desired shape.

Front and rear edges 16,17 of the upper cover 3 are folded back on themselves over a portion of the inner surface 15 to form elongate longitudinally extending recesses which are each arranged to receive a corresponding elongate upper flange 18 longitudinally extending along lower edges of the front and rear spars 4,5, as will be described hereinafter.

The front and rear spars 4,5 each have outer and inner faces 19,20 and are each formed with elongate, longitudinally extending lower and upper flanges 13,18 extending along upper and lower edges of said spars 4,5.

Figure 8:
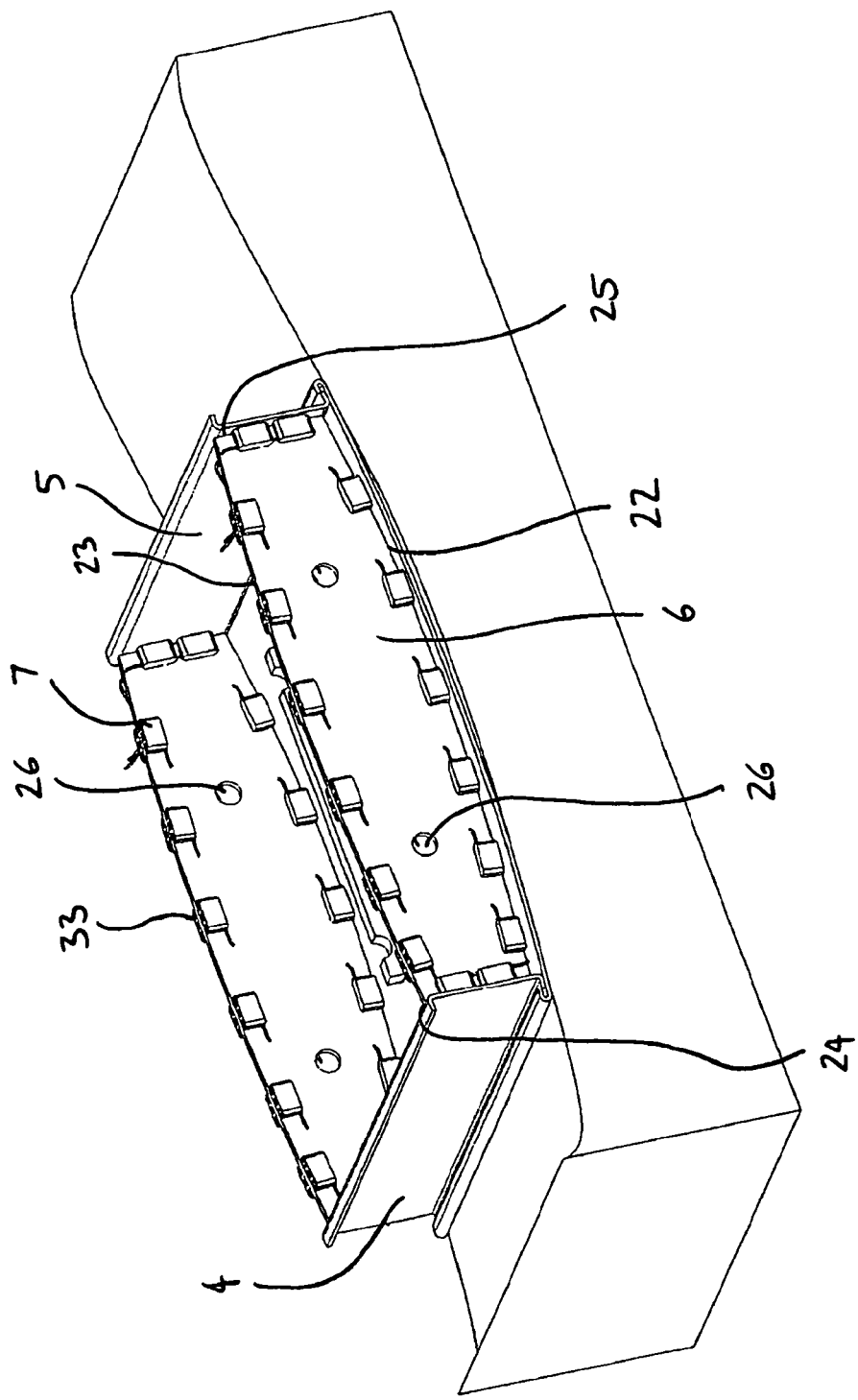
FIG. 8 is a perspective view of a partially assembled wing box for an aircraft shown in FIG. 6, with a pair of ribs shown located in an initial position.
Figure 9:
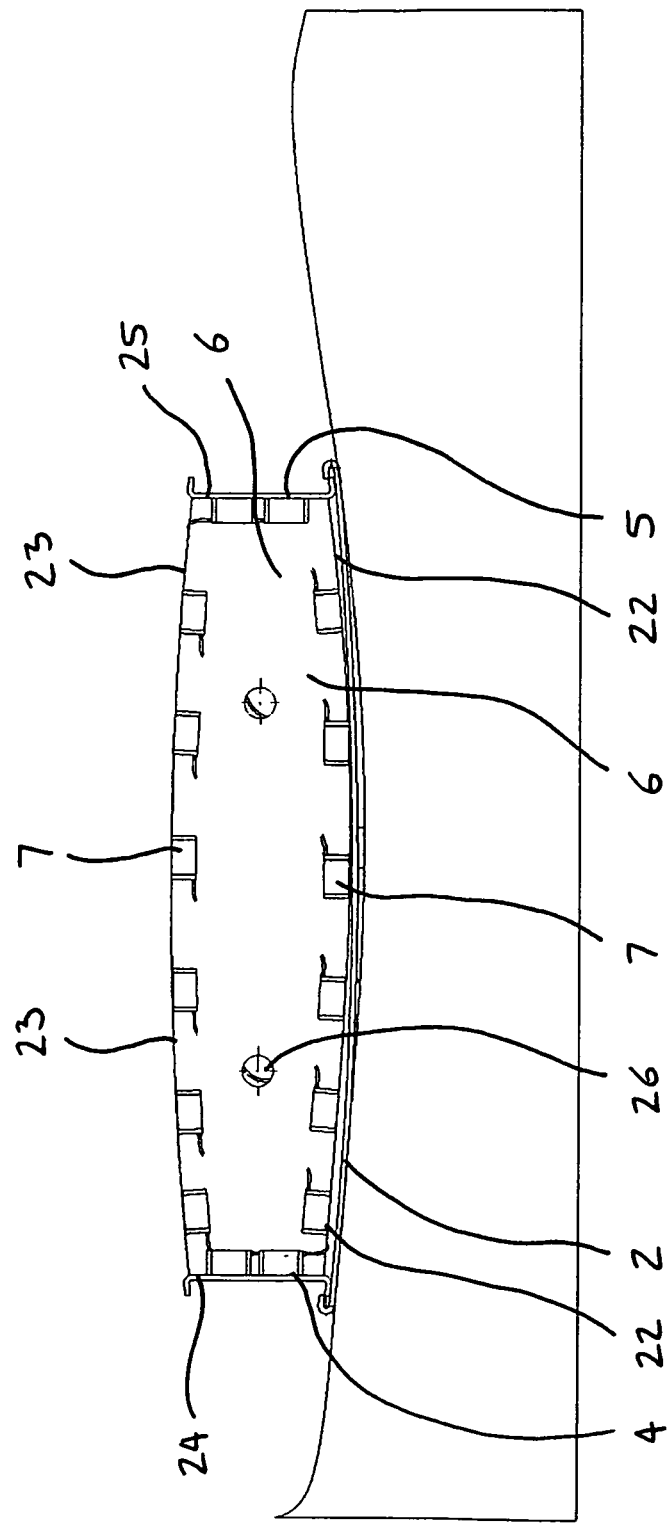
FIG. 9 is an elevational view of a partially assembled wing box for an aircraft as shown in FIG. 8, with a pair of ribs shown located in an initial position.
Figure 10:
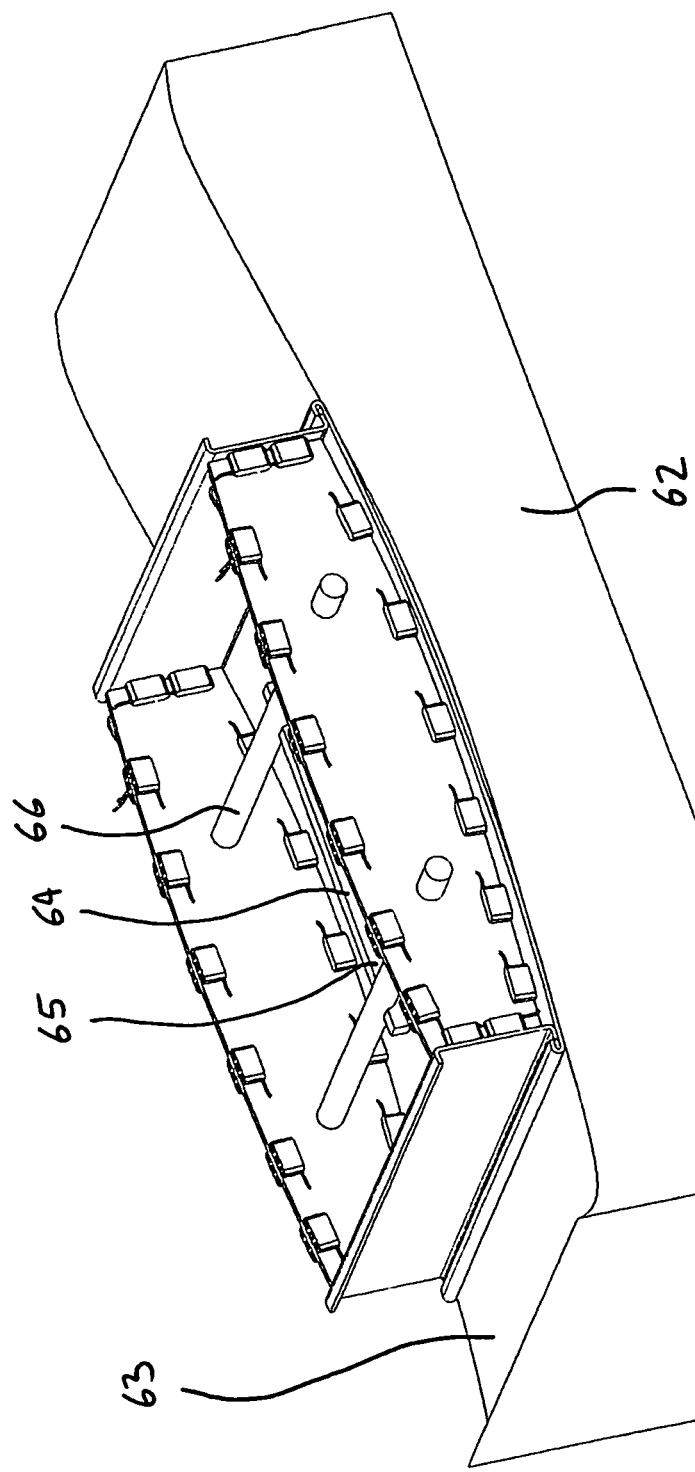
FIG. 10 is a perspective view of a partially assembled wing box for an aircraft as shown in FIG. 8, with rib supports mounted in an initial position.
Figure 11:
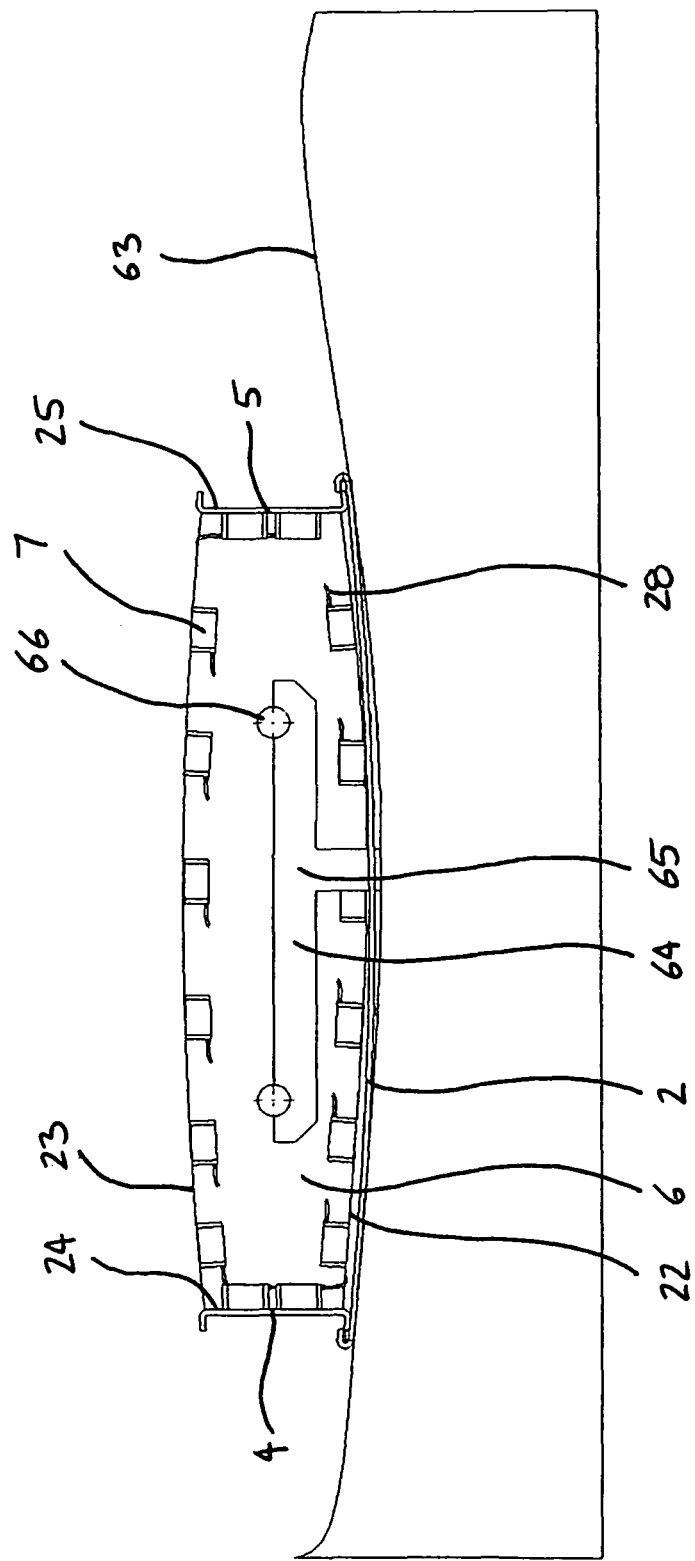
FIG. 11 is an elevational view of a partially assembled wing box for an aircraft as shown in FIG. 10, with rib supports mounted in an initial position.

Each rib 6 is a planar panel with arcuate lower and upper edges 22,23 and straight front and rear edges 24,25 (refer to FIGS. 8 and 9). A pair of tool receiving holes 26 are formed through each rib 6. A number of hydraulic expand and set cylinder arrays 7 are disposed around the periphery of each rib 6, proximate to the arcuate lower and upper edges 22,23 and straight front and rear edges 24,25. In this embodiment, pairs of cylinder arrays 7 are disposed on opposing surfaces of each rib 6 (refer to FIG. 6), although it will be understood that in an alternative embodiment the cylinder arrays 7 may be disposed on one surface of each rib 6 only. Each cylinder array 7 is fixedly mounted to the corresponding rib 6 such that pistons 33 of each cylinder array 7 are configured to expand in a direction transverse to the edge of the rib 6 along which they lie proximate thereto. Fluid inlet pipes 28 extend from each cylinder array 7 to form hydraulic circuits, as will be explained below.

Figure 2:
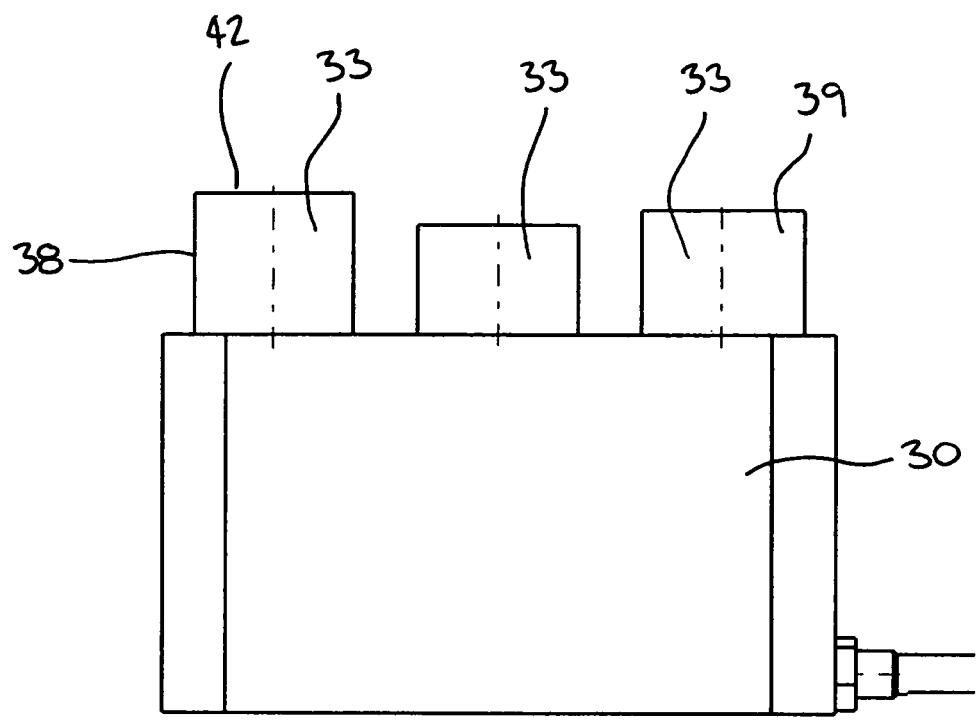
FIG. 2 is a side view of a cylinder array shown in FIG. 1 showing a plurality of pistons in an expanded position in their respective cylinders.
Figure 3:
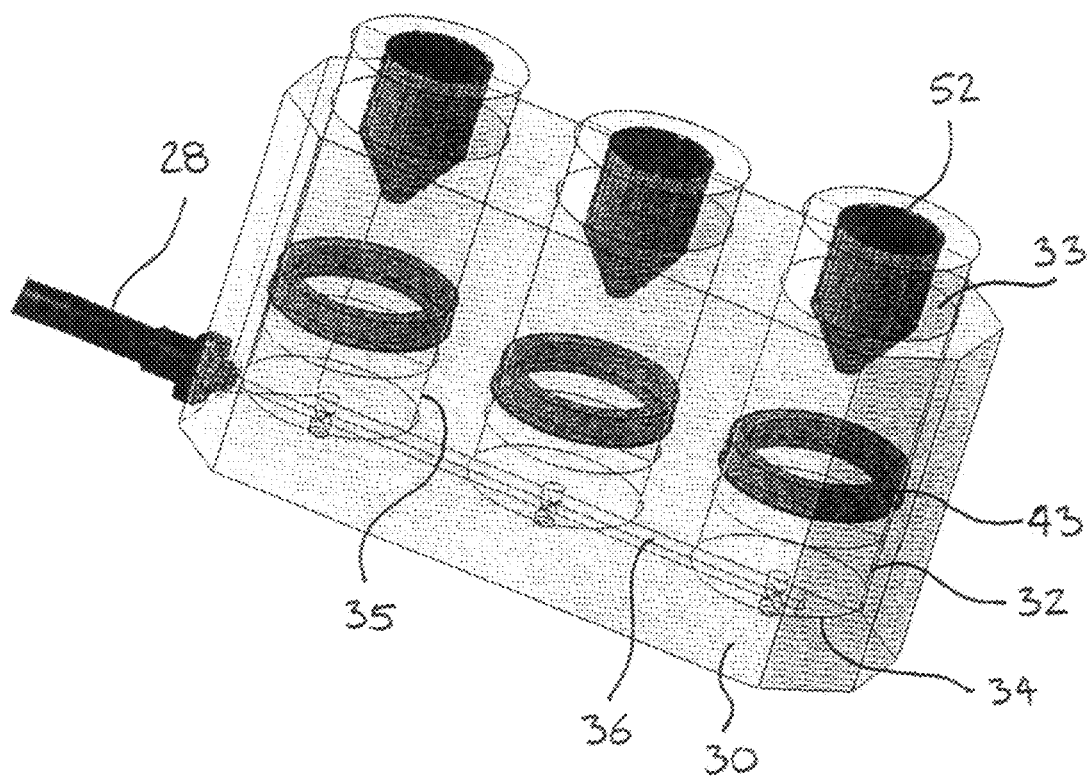
FIG. 3 is a perspective view of a cylinder array shown in FIG. 2 showing a plurality of pistons in an expanded position in their respective cylinders.
Figure 4:
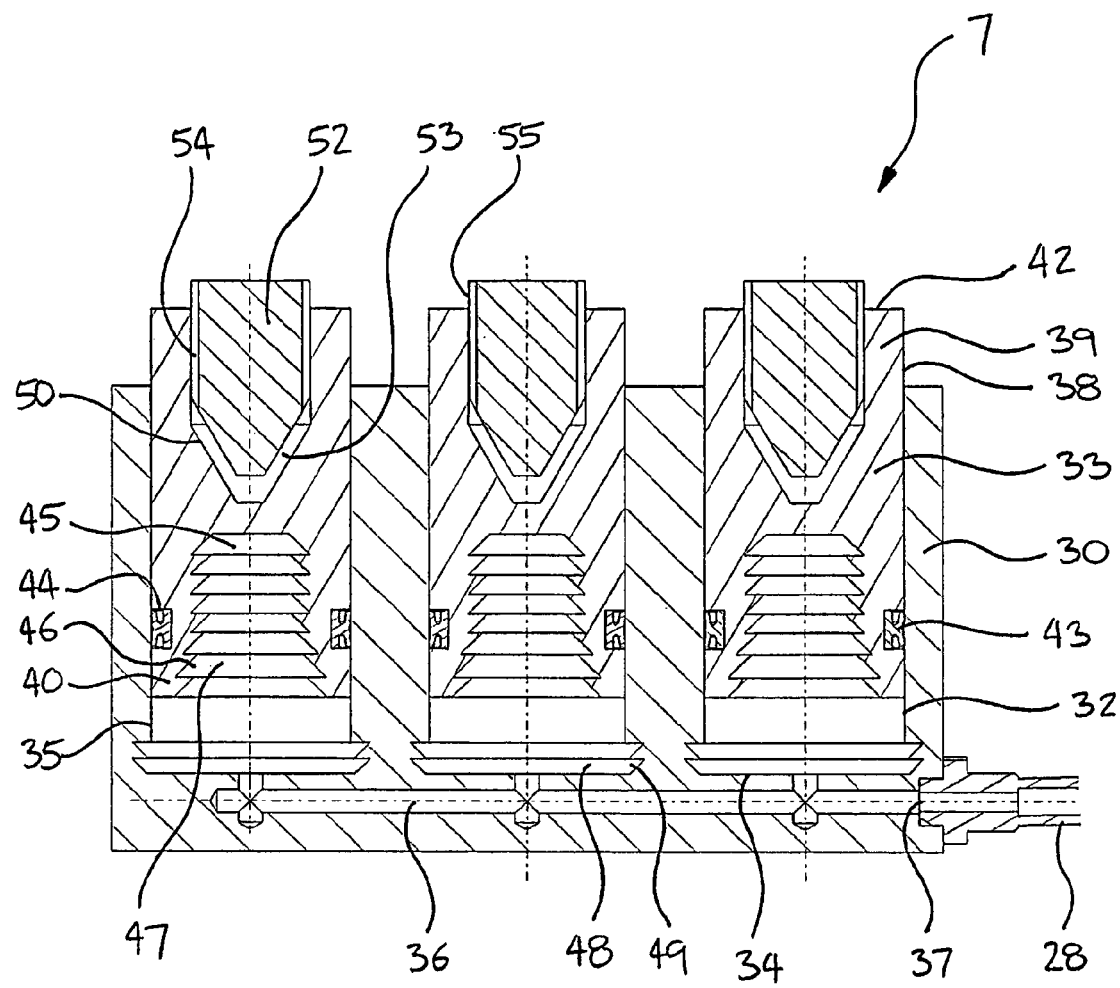
FIG. 4 is an illustrative cross-sectional view of the cylinder array shown in FIG. 2 showing the plurality of pistons in a partially extended position.

Referring now to FIGS. 2 to 4, one of the hydraulic expand and set cylinder arrays 7 which form the urging means is shown. The cylinder array 7 comprises a main housing 30 with three cylinders 32 formed therein, and a piston 33 slidably disposed in each of said cylinders 32. Each cylinder 32 is a cylindrical bore extending into the housing 30 from a top face 33 of said housing 30, and each cylinder 32 comprises a base 34 and a side wall 35 extending circumferentially therearound.

A manifold 36 is formed in the main housing 30 and extends from an inlet 37. The manifold 36 is a fluid passageway which fluidly connects the inlet 37 to each cylinder 4. One of the fluid inlet pipes 28 is fixedly engaged with the inlet 37 so that a fluid can be supplied through the fluid inlet pipe 28 and into each cylinder 32 to hydraulically activate each piston 33 disposed therein from an initial, retracted position, wherein each piston 33 is recessed in its respective cylinder 32, and an expanded position, wherein each piston 33 extends from its respective cylinder 32.

It is envisaged that, in the exemplary embodiments, the fluid is hardenable to into a solid state once the pistons 33 have been urged into their expanded position, as will become apparent hereinafter. In such a case, the fluid is a resin which is initially injected into the housing in a liquid state to hydraulically activate each piston 33, but which subsequently cures into a solid state to set each piston 33 in an expanded position, and prevent the pistons 33 from sliding back into their respective cylinder 32, as will be described below. Although in the following exemplary embodiments a resin is used, it will be appreciated that alternative hardenable fluids may be used. In another embodiment, the fluid is a resin with reinforcing materials, such as finely chopped fibres or nano-particles, suspended in it, in order to prevent the breakup and dusting of the resin once it has cured and is subjected to movement, such as vibration.

The housing 30 is formed from a moulded lightweight plastic material, for example by resin transfer moulding. Although in the present embodiment the cylinder array 1 is a discrete component which is fixedly mounted to its respective rib 6, it will be appreciated that the housing 2 may be integrally formed with the rib 6.

Each piston 33 has a piston side wall 38 which forms a close fit in its respective cylinder 32 and is slidable therein in a longitudinal direction along a central axis of the respective cylinder 32. A first end 39 of the piston 33 is disposed to extend from its respective cylinder 32 when the piston 33 is urged from its cylinder 32, and an opposing second end 40 of the piston 33 is disposed in the cylinder 34 so that the resin injected into the cylinder 34 acts on said second end 40 when the cylinder array 7 is operated.

The inlet 37, manifold 36 and plurality of chambers 32 together form a hydraulic system in fluid communication with each other to urge each piston 33 out of, or into and out of, their respective cylinder 32, as will become apparent hereinafter.

Each piston 33 has an upper face 42 formed at the first end 39 thereof which is arranged as a surface to abut against and/or mate with a corresponding surface of one of the front and rear spars 4,5 or lower and upper covers 2,3.

A seal 43 extends circumferentially around the piston side wall 38 disposed in a circumferentially extending recess 44. The seal 43 is a double acting seal; that is a seal which is capable of resisting pressure in two directions, such that the seal facilitates vacuum charging of the hydraulic system with an uncured resin (as will become apparent below) to prevent compressible air being trapped in the system, as well allowing a positive pressure to be applied in the chamber 17 to urge an upper end of the piston 3 from the cylinder 4. It is envisaged that the seal 43 may be a high pressure hydraulic oil seal, an o-ring, or may utilise a 'bellows' arrangement, all of which facilitate the containment of the hydraulic fluid.

A shear resisting means 45 is formed in each piston 33 and comprises a plurality of grooves 46 which circumferentially extend around a hollow 47 formed in the second end 40 of each piston 3 into which the resin will flow when the resin is injected into the cylinder 32. Therefore, when the piston 3 is engaged or mated with a corresponding surface of one of the front and rear spars 4,5 or lower and upper covers 2,3 and the resin injected into the cylinder 32 and grooves 46 cures and hardens, each piston 33 is restricted from shearing relative to said cured resin, and being pulled out of its respective cylinder 32.

A corresponding shear resisting means 48 is formed in the cylinder side walls 35, proximal to the cylinder base 34 and comprises a plurality of grooves 49 which circumferentially extend around the cylinder side wall 35 into which the resin will flow when the resin is injected into the cylinder 32. Therefore, when the piston 3 is engaged or mated with a corresponding surface of one of the front and rear spars 4,5 or lower and upper covers 2,3 and the resin injected into the cylinder 32 and grooves 46 cures and hardens, each piston 33 and cured resin disposed in the chamber 17 is restricted from shearing relative to the respective cylinder side wall 35, and being pulled out of its respective cylinder 32

It will be understood that the shear resisting means 45,48 are not limited to the above arrangements and that any arrangement of grooves or recesses may be used to prevent shearing of the piston 33 relative to a cured resin in a solid state in the cylinder 32. For example, in an alternative arrangement a plurality of dimples (not shown) may be formed in the hollow side wall 15. The shear resisting means 45,48 of the piston 33 and cylinder 32 respectively prevent the piston from being pulled out of the housing 1 when resin in the chamber 17 has cured and prevent a vacuum being created in the chamber 17, and therefore aid in the prevention of dusting of said cured resin, as will become apparent hereinafter.

Each piston 3 is formed from a pre-cured carbon fibre composite, with a portion of the first end 39 initially being uncured or 'green' carbon fibre composite. It is envisaged that each piston is formed with an uncured end by means of a cold junction curing process, with the last 5 mm of the piston being left uncured until the piston 3 abuts and/or mates with an opposing surface of a corresponding component.

A secondary cylinder 50 is formed in the first end 39 of each piston 3. A secondary piston 52 is slidably received in each secondary cylinder 50. A cavity 53 is defined in each secondary cylinder 50, below the secondary piston 52 to receive a resin or adhesive. The length of each secondary piston 52 substantially conforms to the depth of its corresponding secondary cylinder 50. A plurality of longitudinally extending gullies 54 are formed in a side wall 55 of each secondary piston 52 to provide a number of fluid passageways between the cavity 53 and the piston first end 39. Therefore, when each secondary piston 52 locates against one of the front and rear spars 4,5 or lower and upper covers 2,3 and is urged into the secondary cylinder 50 as each piston 33 is urged towards said one of the front and rear spars 4,5 or lower and upper covers 2,3, then the resin or adhesive is forced to flow along the gullies 54 to between each piston first end 39 and the inner surface or face 9,15,20 of one of the front and rear spars 4,5 or lower and upper covers 2,3 respectively.

Although each piston 33 has a secondary piston 52 disposed therein, it will be appreciated that the secondary pistons are optional. Each secondary piston 52 is formed from a cured carbon fibre material, with an upper end 58 being uncured or 'green' carbon fibre composite.

Figure 5:
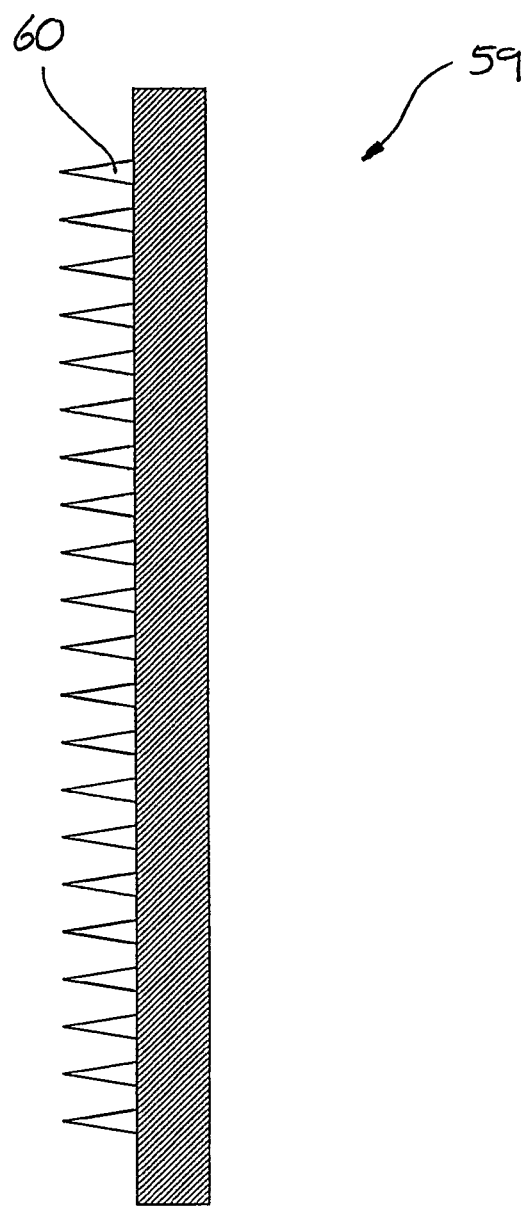
FIG. 5 is an illustrative cross-sectional side view of a mating means.

Referring to FIG. 5, mating means 59 extend from the inner surfaces 9,15 of the lower and upper covers 2,3 and inner faces 20 of the front and rear spars 4,5 where the first end 39 of each piston 33 is arranged to abut against and/or mate therewith. It is also envisaged that said mating means will interact with the respective upper end of each secondary piston 52.

As can be seen from FIG. 5, the mating means 59 comprises an array of projections 60 which upstand from each of inner surfaces 9,15 of the lower and upper covers 2,3 and inner faces 20 of the front and rear spars 4,5. The projections 60 are distributed evenly over a mating region against which it is intended that the piston first end 39 abuts. When the piston first end 39 is urged against the respective front and rear spars 4,5, and lower and upper covers 2,3, the projections 60 penetrate said piston first end 39 to fixedly mount each piston 39 thereto.

Each projection 60 comprises a conical spike, although it will be appreciated that alternative arrangements may be used, for example, projections with a frustoconical base and a conical tip with an overhanging edge, projections with a cone leaning at an angle to the vertical, with a pair of ridges on its overhanging side or projections with a frustoconical base, a frustoconical part with an overhanging edge, and a conical tip with an overhanging edge. Such projections have a part with an overhanging edge which enhances the pull-off (tensile) strength of the mating means. Furthermore, projections which extend at an incline may be used to improve properties in a particular loading direction.

In an alternative embodiment, it is envisaged that the mating means comprise a plate (not shown) with a first array of projections upstanding from a first face of said plate and an opposing second array of projections upstanding from an opposing second face of the plate. The first array of projections penetrate the front and rear spars 4,5, and lower and upper covers 2,3 to fixedly mount the mating means thereto and the second array of projections upstand therefrom to penetrate the piston first end 39 when the piston first end 39 is urged thereagainst. The mating means is described in more detail in WO 2008/110835, which is hereby incorporated by reference.

Although one means of mating the first end of each piston with a corresponding inner surface 9,15 of the lower and upper covers 2,3 or inner face 20 of the front and rear spars 4,5, it will be appreciated that alternative mating means may be used. For example, the adhesive or resin ejected from the secondary cylinder may be used to mate the piston first end 39 with said surface or face. Furthermore, the first end 39 may simply abut and urge against said opposing surface or face and not mate therewith.

The method of forming a wing box assembly will now be described with reference to FIGS. 6 to 20.

Figure 6:
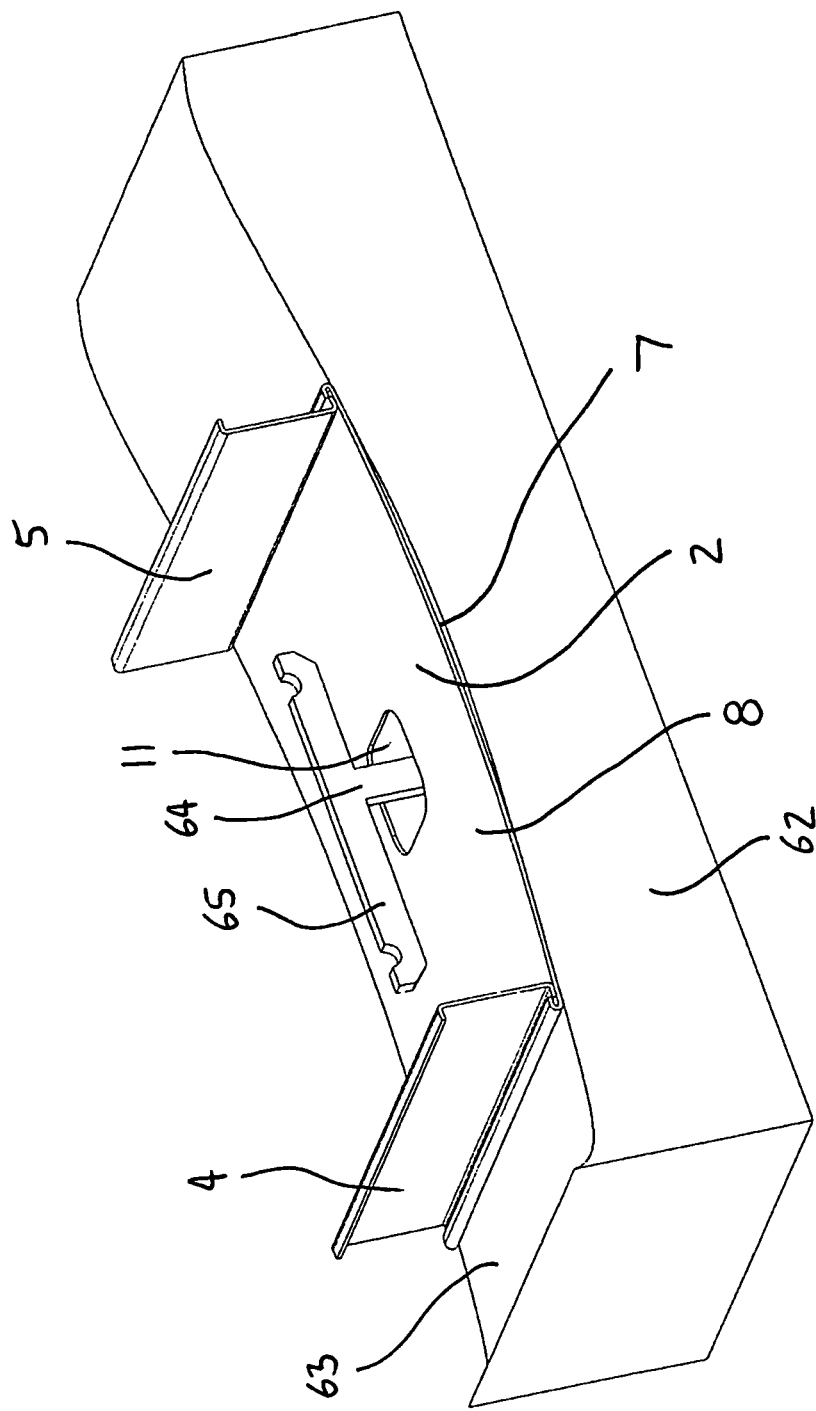
FIG. 6 is a perspective view of a partially assembled wing box for an aircraft with a lower cover in an initial configuration located on a lower tooling and spars upstanding therefrom.
Figure 7:
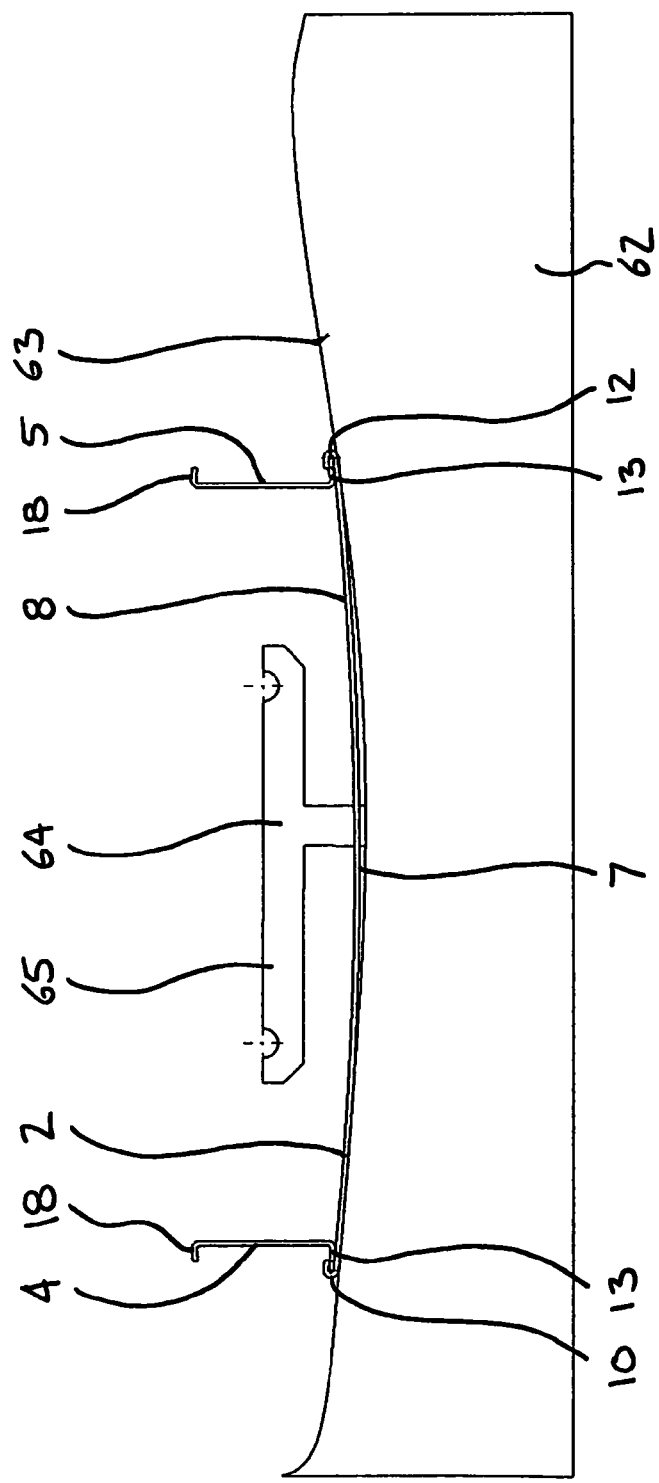
FIG. 7 is an elevational view of a partially assembled wing box for an aircraft as shown in FIG. 6, with a lower cover in an initial configuration located on a lower tool and spars upstanding therefrom.

Referring to FIGS. 6 and 7, the lower cover 2, which is cured in an initial configuration with the outer surface 7 being formed to have a flatter than finally desired shape, is disposed on a lower half of a split female tooling 62. The lower tooling 62 has a mould face or inner mould line 63 which corresponds to a predetermined desired shape or 'outer mould line' of the assembled wing box assembly.

A collapsible tooling 64 is now disposed through the tool receiving aperture 11 formed through the lower cover 2 between the outer and inner surfaces 8,9 thereof. The collapsible tooling 64 supports the ribs 6 in a perfect theoretical central position within the wing box during assembly, as will become apparent below. The collapsible tooling 64 comprises a main T-shaped section 65 and rib support rods 66 (refer to FIG. 10) which are supported on the main T-shaped section 65. An end of the collapsible tooling 64 is fixedly mounted in the lower tooling 62 and extends into a system receiving space defined between the front and rear spars 4,5, the lower and upper covers 2,3, and the ribs 6.

The front and rear spars 4,5 are disposed on the lower cover 2 and arranged to upstand therefrom along the opposing front and rear edges 10,12 of the lower cover 2 respectively with the elongate lower flange 13 of each front and rear spar 4,5 being disposed adjacent to the corresponding elongate longitudinally extending recesses formed along said front and rear edges 10,12.

The front and rear spars 4,5 are initially finished in a shape and configuration different to that finally required in the assembled state. This allows each spar 4,5 to impart a 'prestressed' force on the assembled wing box. These spars 4,5 are assembled by hard fixing one end and then applying a force to the other end via hydraulic tooling, and at this stage the spars 4,5 are bent further than their at rest position.

Referring now to FIGS. 8 to 11, the plurality of cylinder arrays 7 are assembled and fixedly mounted to each rib 6 or, in an alternative embodiment, the housing 30 of each cylinder array 7 is integrally formed with its respective rib 6, to form the urging means. The pistons 33 of each cylinder array 7 are initially in a retracted position in their respective cylinder 32.

The ribs 6 are disposed in their predetermined position between the lower cover 2 and front and rear spars 4,5 and securely located in position and attached to the collapsible tooling 64. The rib support rods 66 extend through the tool receiving holes 26 formed in each rib 6 and locate and are held in position by the main T-shaped section 65 of the collapsible tooling 64. Therefore, each rib 6 is held in a predetermined position with respect to the lower tooling 62.

The hydraulic connections are then assembled, with each of the cylinder arrays 7 is connected by the fluid inlet pipes 28 extending therefrom to form a hydraulic circuit. The cylinder arrays 7 are connected in two independent hydraulic circuits, with the cylinder arrays 7 aligned along the front and rear edges 24,25 of each rib 6 opposing the front and rear spars 4,5 being fluidly connected to form a first hydraulic circuit and to act as a first urging means, and the cylinder arrays 7 aligned along the arcuate lower and upper edges 22,23 of each rib 6 opposing the lower and upper covers 2,3 being fluidly connected to form a second hydraulic circuit and to act as the second urging means.

Electrical, hydraulic and fuel systems (not shown) are then disposed and assembled in the system receiving space defined between the front and rear spars 4,5, the lower and upper covers 2,3, and the ribs 6, before the upper panel is disposed in position. This reduces the difficulties associated with conventional wing box assemblies as difficulties in access to the system receiving space are eased.

Figure 12:
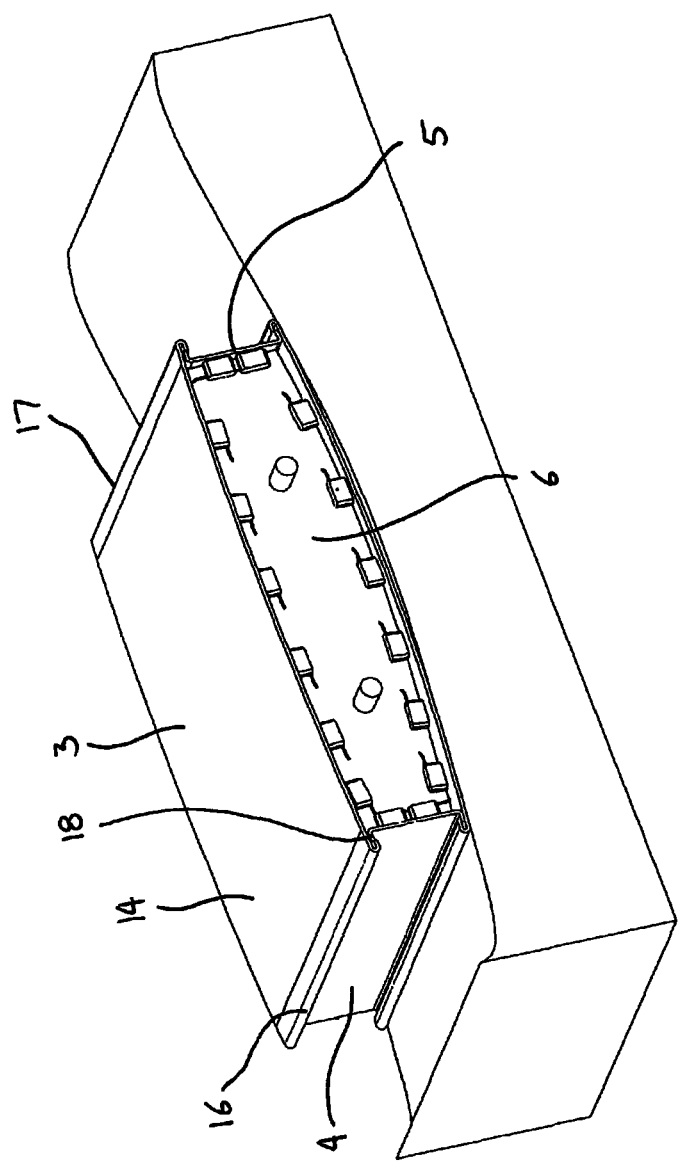
FIG. 12 is a perspective view of a partially assembled wing box for an aircraft as shown in FIG. 10, with an upper cover in an initial configuration disposed thereon.
Figure 13:
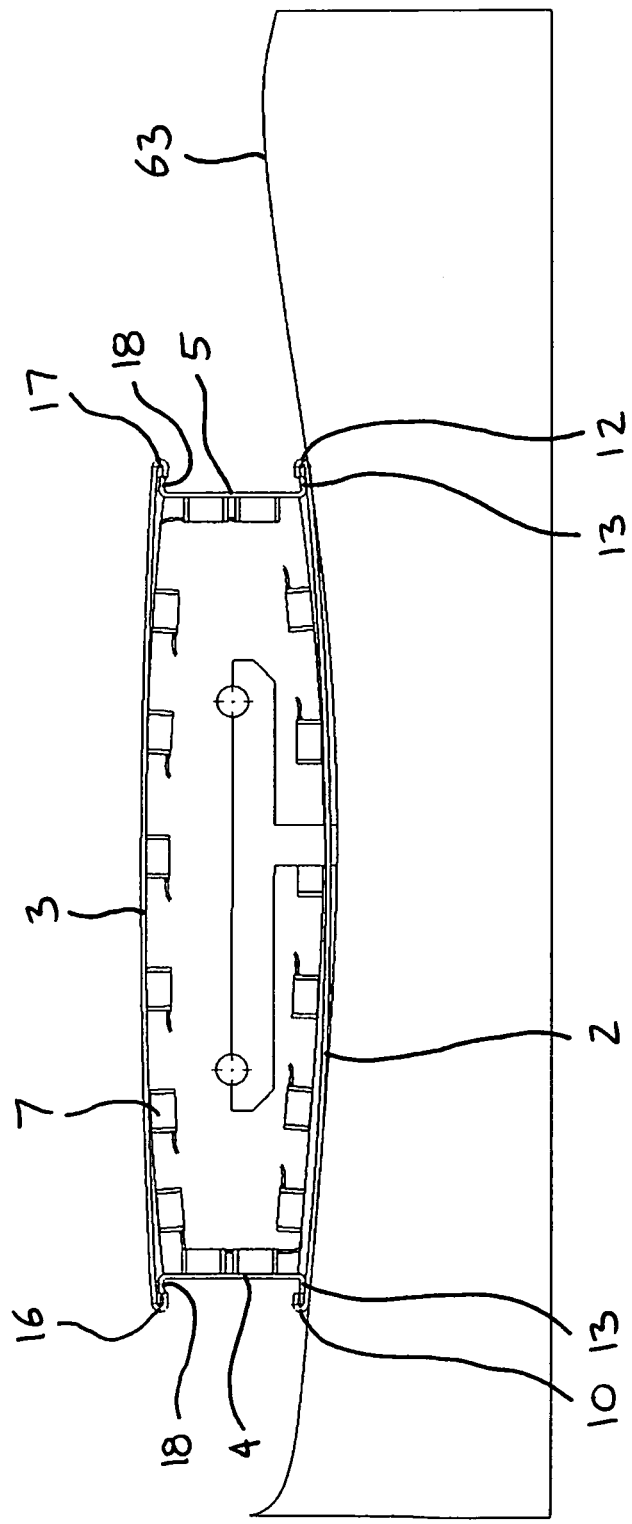
FIG. 13 is an elevational view of a partially assembled wing box for an aircraft as shown in FIG. 12, with an upper cover in an initial configuration disposed thereon.

Referring now to FIGS. 12 and 13, the top cover 3, which is cured in an initial configuration with the outer surface 14 being formed to have a flatter than finally desired shape, is disposed on the front and rear spars 4,5 and arranged with the opposing front and rear edges 16,17 of the upper cover 3 aligned therealong and the elongate upper flange 18 of each front and rear spar 4,5 being disposed adjacent to the corresponding elongate longitudinally extending recesses formed along said front and rear edges 16,17. The system receiving space is then defined and enclosed between the front and rear spars 4,5, the lower and upper covers 2,3.

Figure 14:
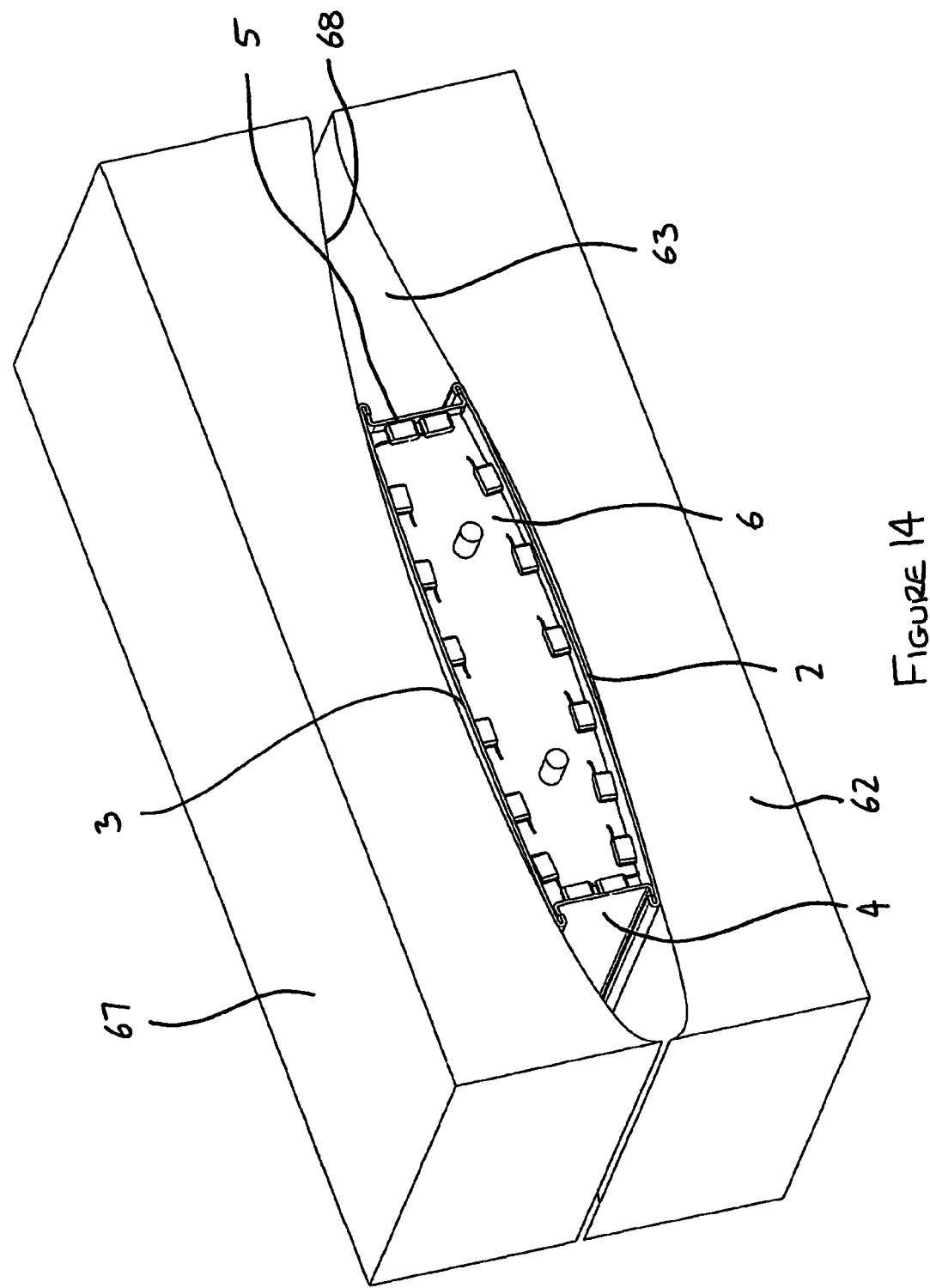
FIG. 14 is a perspective view of a partially assembled wing box for an aircraft as shown in FIG. 12, mounted between an upper and a lower tooling.
Figure 15:
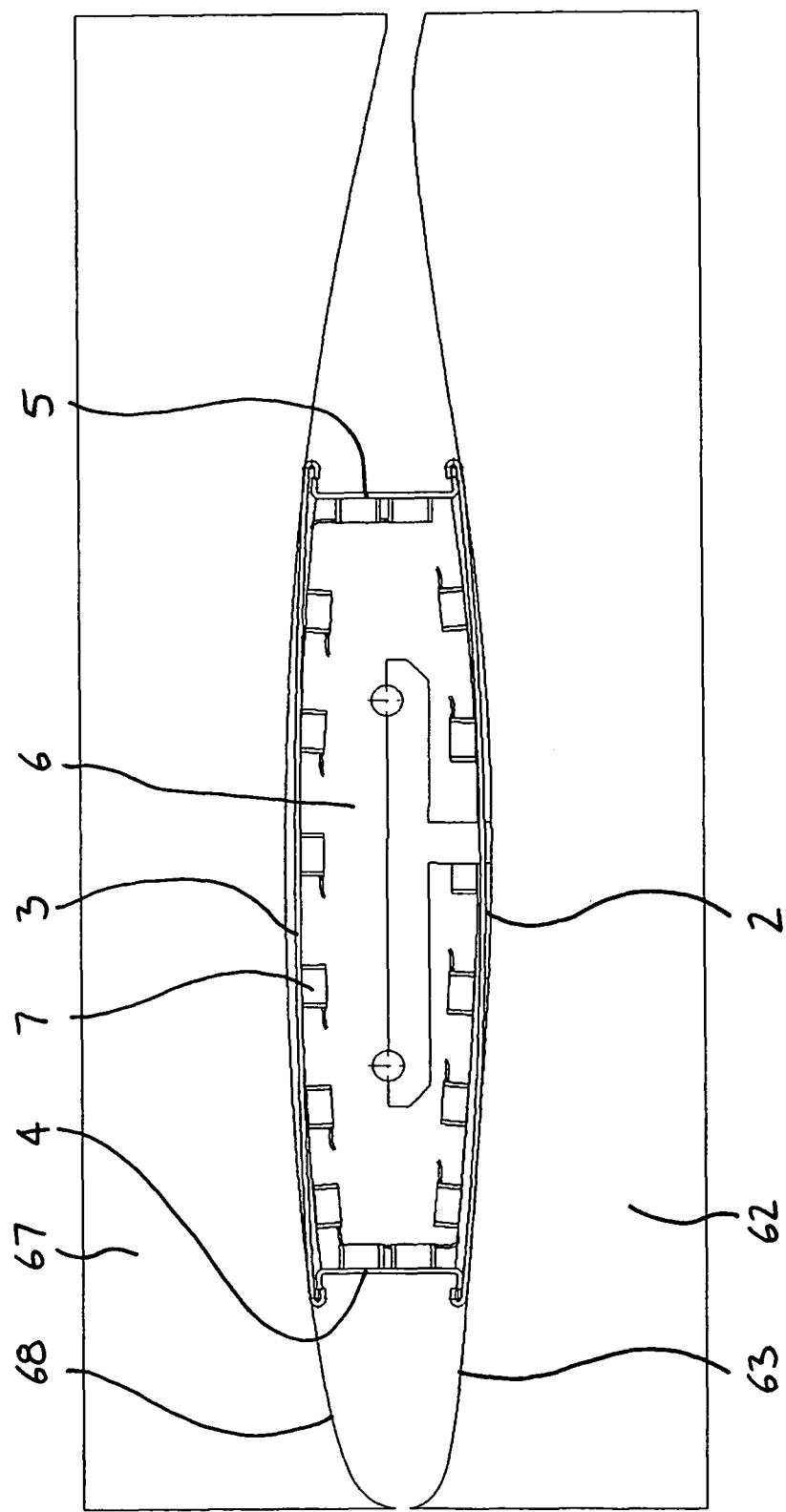
FIG. 15 is an elevational view of a partially assembled wing box for an aircraft mounted between an upper and a lower tooling as shown in FIG. 14.

An upper half of the split female tooling 67 is then disposed above the upper panel 3, and the upper tooling 67 is aligned in position with respect to the lower tooling 62 to define a predetermined ideal outer mould line of an assembled wing box as shown in FIGS. 14 and 15. The upper tooling has a mould face or inner mould line 68 which corresponds to a predetermined desired shape or 'outer mould line' of the assembled wing box assembly.

Figure 16:
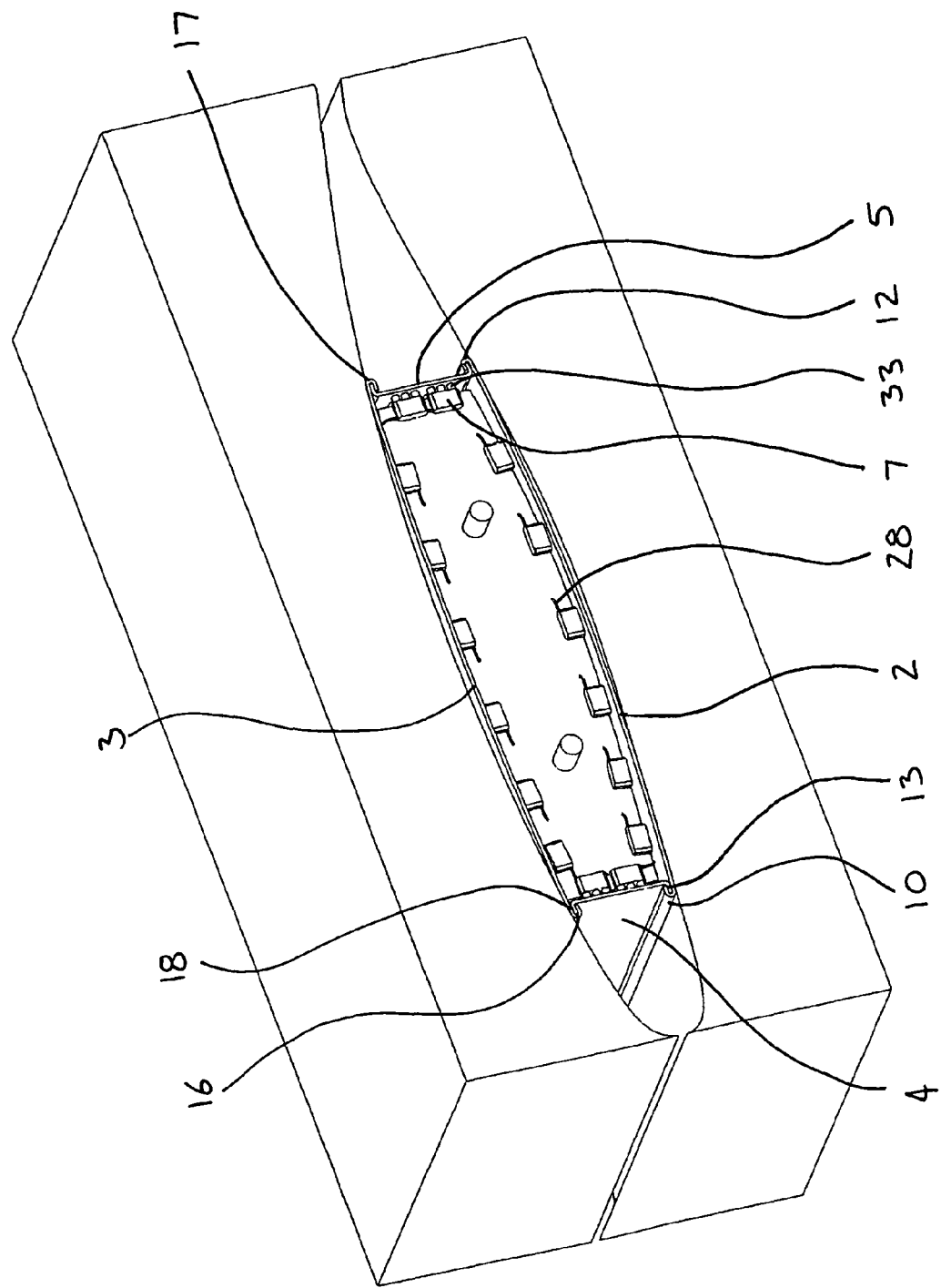
FIG. 16 is a perspective view of a partially assembled wing box for an aircraft showing one set of cylinder arrays activated to extend in an expanded position and the spars disposed in a mounted position.
Figure 17:
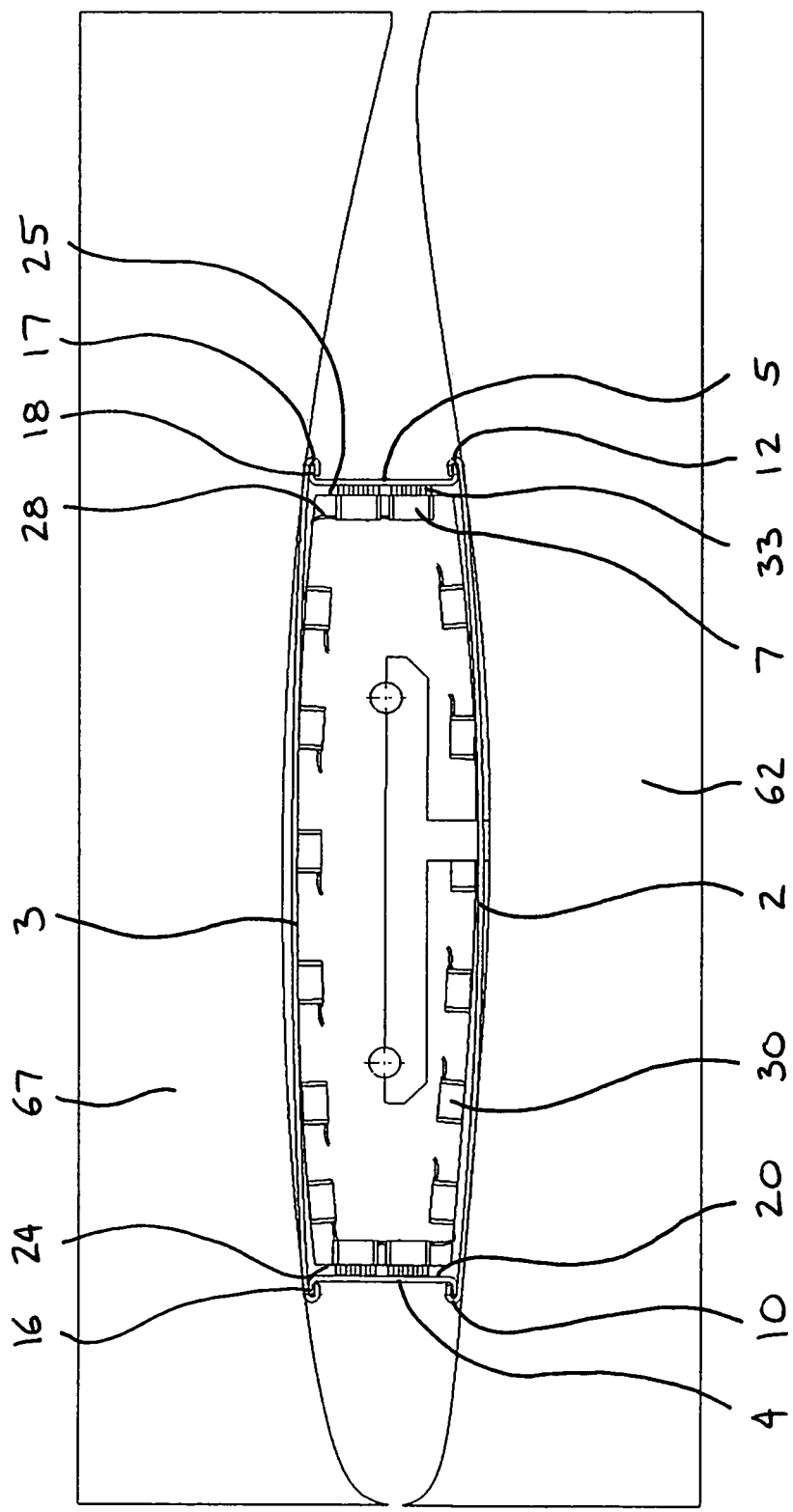
FIG. 17 is an elevational view of a partially assembled wing box for an aircraft as shown in FIG. 16 showing one set of cylinder arrays activated to extend in an expanded position and the spars disposed in a mounted position.

Referring to FIGS. 16 and 17, the front and rear spars 4,5 are then released from being held in their overdrawn position and deflect due to their resilient nature and the lower and upper flanges 13,18 are received into the elongate longitudinally extending recesses formed along the front and rear edges 10,16,12,17 of the lower and upper covers 2,3. It will be appreciated that the wing box assembly is now in a partially pre-stressed state due to the resilience of the spars.

Although in this exemplary embodiment the spars 4,5 are initially held in a stressed, bent position and are then released to engage in the elongate longitudinally extending recesses, it will be understood that in an alternative embodiment the spars 4,5 are not initially held in a stressed position and move into engagement with the lower and upper covers 2,3 when the cylinder arrays are activated as will be explained hereinafter.

Sealing and/or bonding agents are disposed in the elongate longitudinally extending recesses formed along the front and rear edges 10,16,12,17 of the lower and upper covers 2,3 prior to the lower and upper flanges 13,18 of the front and rear spars 4,5 engaging therein to provide structural integrity and fuel sealing.

Referring to FIGS. 16 and 17, the first hydraulic circuit is then activated. That is, curable resin is injected through the fluid inlet pipes 28 connected to each cylinder array on the first circuit into the cylinders 32 of the cylinder arrays aligned along the front and rear edges 24,25 of each rib 6 so that the resin acts on each piston 33 disposed therein. When the resin is injected into each cylinder 32 and the first end 39 of each piston 33 is urged to slide and extend away from the housing 30 of the respective cylinder array and act against the inner face 20 of the respective spar 4,5.

The ribs 6 are each held in a predetermined position by the collapsible tooling 64 which is fixedly mounted to the lower tooling 62 and so each rib is held in a desired, predetermined position with respect to the lower and upper halves of the split female tooling 62,67. Therefore, when the cylinder arrays 7 on the first hydraulic circuit are activated as described above, then the rib is fixedly held by the collapsible tooling 64 and the first ends 39 of the pistons 33 act on the inner face 20 of the front and rear spars 4,5 and urge said spars 4,5 outwardly to fixedly locate the front and rear spars 4,5 in place and partially pre-stress the assembly.

The manifold 36 linking each cylinder 32 in each cylinder array 7 ensures that the same hydraulic pressure is applied by the resin injected therein on each piston 33, so that the pistons 33 slide in unison out of their respective cylinders 32 and each piston 33 applies the same pressure to the inner face 20 of the respective front or rear spar 4,5 against which the first end 39 of the piston 33 locates and mates thereagainst.

The first end 39 of each piston is penetrated by the mating means 59 on the respective front or rear spar 4,5 to mate the piston 33 and respective spar 4,5 to each other. This helps restrict shearing of the components relative to each other, as well as tensile pull off.

As each piston 33 is urged to slide towards the respective spar, the secondary piston 52 extending from the first end 39 of each piston 33 acts against the respective spar 4,5 and is urged into its respective secondary cylinder 50. Therefore, the resin and/or adhesive disposed in the cavity 53 defined in each secondary cylinder 50 is urged along the gullies 54 formed in the secondary piston 52 and into the space between the inner face 20 of the spar 4,5 and the first end 39 of the piston 33. This resin and/or adhesive aids the fixedly mounting of the piston 33 to the respective inner face 20 of the spar 4,5.

When the cylinder arrays 7 in the first hydraulic circuit forming the second urging means have been activated and the spars 4,5 fixedly located in their desired positions, then the pressure is maintained in the first hydraulic circuit until the resin in each cylinder has cured or set. In this embodiment it is envisaged that the pressure imparted by the hydraulic system generates sufficient heat to cure the resin disposed in each cylinder 32 and manifold 36. Alternatively, removable heaters (not shown) may be employed to cure the resin, or an infra red, ultra violet or inductive curing means may be used. Similarly, the uncured first end 39 of each piston 33 is cured in a similar manner.

Figure 18:
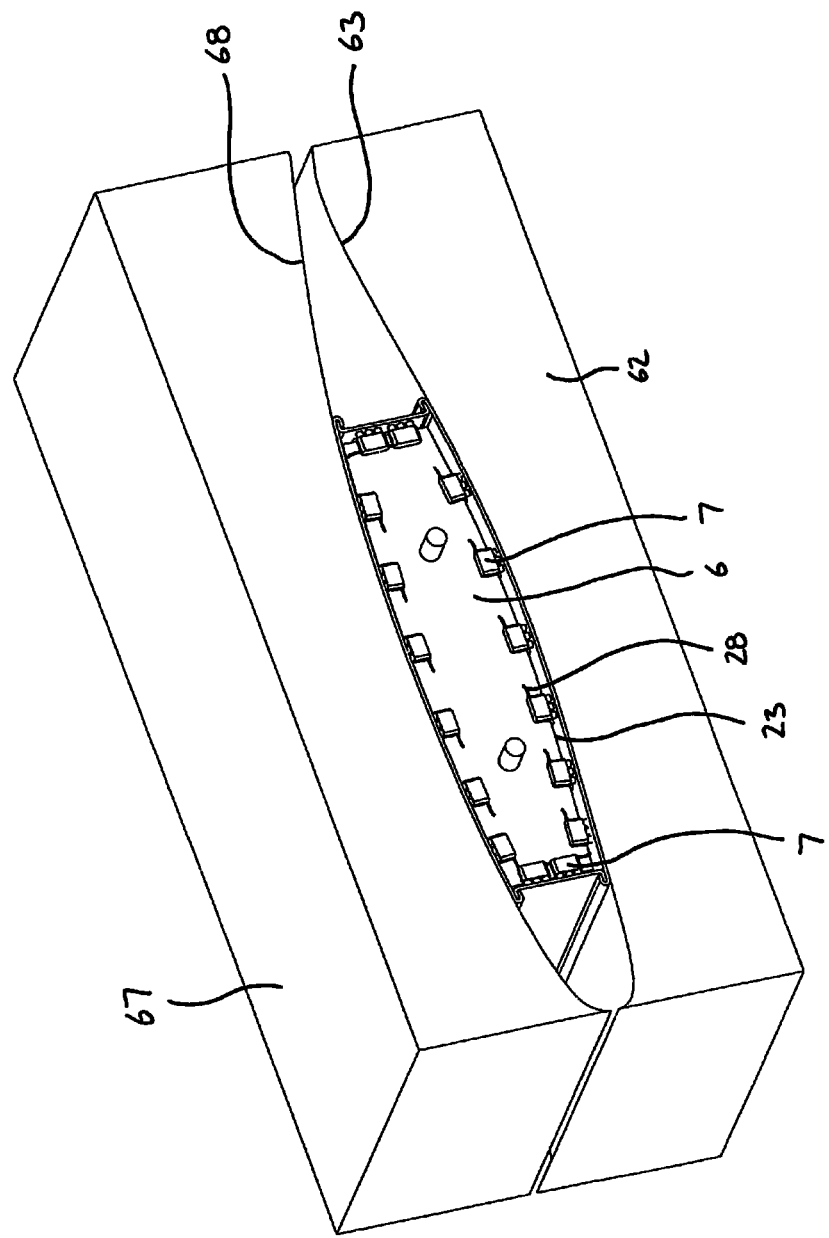
FIG. 18 is a perspective view of an assembled wing box for an aircraft as shown in FIG. 16 with another set of cylinder arrays activated to extend in an expanded position and the upper and lower covers distended into a predetermined position.
Figure 19:
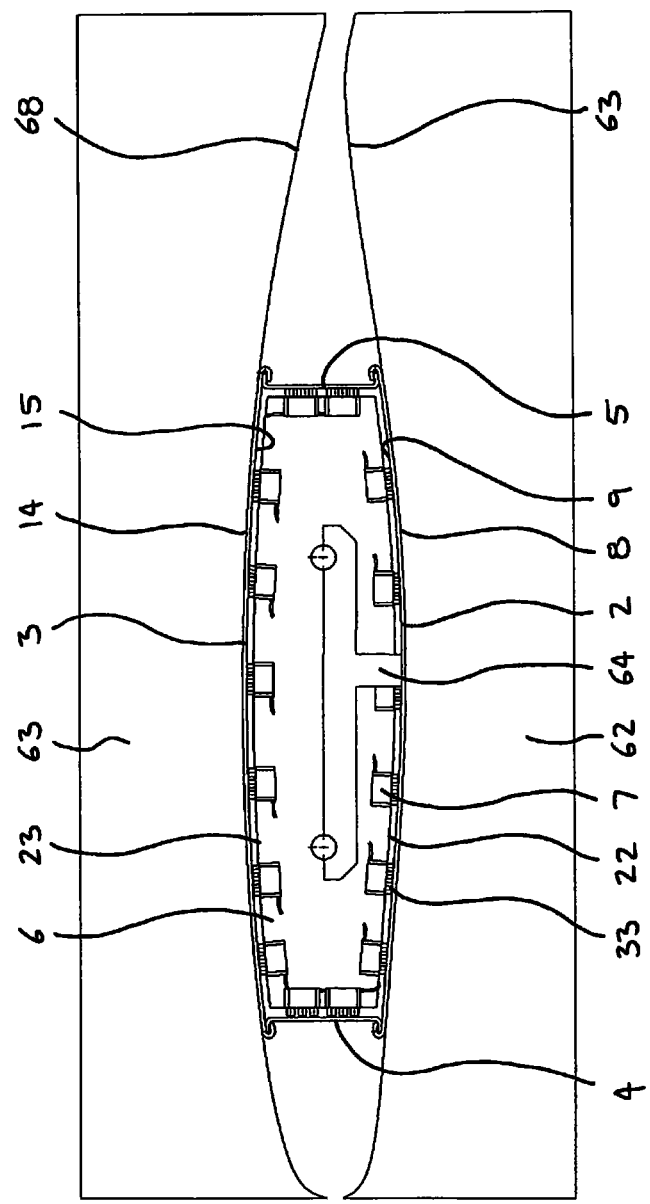
FIG. 19 is an elevational view of an assembled wing box for an aircraft as shown in FIG. 18, with another set of cylinder arrays activated and the upper and lower covers distended into a predetermined position.

Referring to FIGS. 18 and 19, once the resin in the cylinder arrays 7 of the first hydraulic circuit has cured, the second hydraulic circuit is activated. That is, curable resin is injected through the fluid inlet pipes 28 connected to each cylinder array of the second circuit into the cylinders 32 of the cylinder arrays aligned along the arcuate lower and upper edges 22,23 of each rib 6 so that the resin acts on each piston 33 disposed therein. When the resin is injected into each cylinder 32 and the first end 39 of each piston 33 is urged to slide and extend away from the housing 30 of the respective cylinder array and act against the inner surface 9,15 of the respective lower and upper cover 2,3.

The ribs 6 are each held in a predetermined position by the collapsible tooling 64 which is fixedly mounted to the lower tooling 62 and so each rib 6 is held in a desired, predetermined position with respect to the lower and upper halves of the split female tooling 62,67. Therefore, when the cylinder arrays 7 of the second hydraulic circuit are activated as described above, then each rib 6 is fixedly held by the collapsible tooling 64 and the pistons 33 each apply an equal pressure on the inner surface 9,15 of the respective lower and upper cover 2,3. The first ends 39 of the pistons 33 of the second hydraulic circuit act on the inner surface 9,15 and urge said lower and upper covers 2,3 outwardly.

The lower and upper covers 2,3 are urged outwardly so that the outer surfaces 8,14 of the lower and upper covers 2,3 are urged into contact with the inner mould lines 63,68 of the lower and upper toolings 62,67 respectively. Therefore, the lower and upper covers 2,3 are urged into a predetermined position against the inner mould lines 63,68 of the lower and upper toolings 62,67 respectively and so the outer surfaces 8,14 form a desired, predetermined shape which is the perfect theoretical 'outer mould line' of the wing box.

As the lower and upper covers 2,3 swell as the pistons 33 act thereon the front and rear edges 10,16,12,17 of the lower covers 2,3 act on the front and rear spars 4,5 to further pre-stress the assembly, via the trapped joint formed by the lower and upper flanges 13,18 of the spars 4,5 extending in the elongate recesses formed along the front and rear edges 10,16,12,17 of the lower covers 2,3. Further, the resilient nature of the lower and upper covers 2,3 attempts to counteract the action of the pistons 33 and flex inwardly into their unstressed configuration. Therefore, the entire wing box assembly is pre-stressed.

The manifold 36 linking each cylinder 32 in each cylinder array 7 ensures that the same hydraulic pressure is applied by the resin injected therein on each piston 33, so that the pistons 33 slide in unison out of their respective cylinders 32 and each piston 33 applies the same pressure to the inner face (9, 15) of the respective cover 2,3 against which the first end 39 of the piston 33 locates and mates thereagainst.

The first end 39 of each piston is penetrated by the mating means 59 on the respective lower and upper covers 2,3 to mate the piston 33 and respective lower and upper cover 2,3 to each other. This helps restrict shearing of said components relative to each other.

As each piston 33 is urged to slide towards the respective spar, the secondary piston 52 extending from the first end 39 of each piston 33 acts against the respective cover 2,3 and is urged into its respective secondary cylinder 50. Therefore, the resin and/or adhesive disposed in the cavity 53 defined in each secondary cylinder 50 is urged along the gullies 54 formed in the secondary piston 52 and into the space between the inner surface 9,15 of each cover 2,3 and the first end 39 of the piston 33. This resin and/or adhesive aids the fixedly mounting of the piston 33 to the respective inner surface 9,15 of the lower and upper cover 2,3.

When the covers 2,3 locate and are urged against the solid inner mould lines 63,68 of the lower and upper toolings 62,67 respectively, a sharp rise in the inject pressure of the resin injected into each cylinder array 7 will be seen, and so it is possible to monitor when the covers 2,3 are in their desired shape and position. Therefore, once the appropriate hydraulic pressure has been achieved, then the resin is cured or set. The pressure is maintained in the first hydraulic circuit until the resin in each cylinder has cured or set. In this embodiment it is envisaged that the pressure imparted by the hydraulic system generates sufficient heat to cure the resin disposed in each cylinder 32 and manifold 36, however in an alternative embodiment, removable heaters (not shown) or similar means are employed to cure the resin. It is also envisaged that induction heating of the mating means may be used to cure the resin. Similarly, the uncured first end 39 of each piston 33 is cured in a similar manner.

It will be appreciated that the movement of the pistons of the cylinder arrays account for discrepancies and low tolerances of the inner face 20 or inner surface 9,15 of the front and rear spars 4,5 and lower and upper covers 2,3 respectively, because the pistons can each expand into contact with said face or surface by the required amount and then apply the same pressure on said face or surface, irrespective of the amount by which the piston extends from its respective cylinder. Thus a perfect wing box assembly may be achieved, with a predetermined outer mould line, utilising low tolerance components, no fettling or craftsmanship and an almost fully automated assembly system.

Once the resin has cured or set in all the cylinder arrays 7 in both the first and second hydraulic circuits, then the wing box assembly is removed from the split female tooling 62,67. This is achieved by firstly lifting off the upper tooling 67, disassembling the collapsible tooling 64 and removing the rib support rods 66 from the assembly, via the tool receiving aperture 11. Finally the wing box assembly is lifted off the lower tooling 62.

Any internal systems in the system receiving space can be fixedly mounted and clamped in their final positions, with said system receiving space accessed through the tool receiving space 11. It will be understood that the internal systems in the system receiving space may be fitted by access through the tool receiving space 11 or, alternatively, may be fitted before the top cover is fitted to aid easy access to the system receiving space.

Further assemblies, such as leading and trailing edges are then fixedly mounted to the wing box assembly as required.

An advantage of the above assembly and method of assembly is that, unlike conventional build techniques in which a flatter than required cover is pulled down on to the curved ribs, the covers 2,3 and spars 4,5 are effectively urged outwardly and expanded (as if a blow moulding) from the inside therefore more loads are transferred into the spars from the covers via the trapped joint formed by the lower and upper flanges 13,18 of the spars 4,5 extending in the elongate recesses formed along the front and rear edges 10,16,12,17 of the lower covers 2,3 and the rib foot loads are aided by the compressive load imparted by the covers 2,3 being bent into place by the cylinder arrays 7 that replace conventional rib feet. Although, wing bend and fuel loads still exist the added build stresses are reduced by the elimination of the covers 2,3 wanting to peel off the ribs 6, but in fact the opposite effect exists.

It will be understood that the above assembly and method of assembly is applicable to leading and trailing edge assemblies, as well as horizontal and vertical tail planes. Furthermore, it is envisaged that the above method of assembly may be applied to a fuselage wherein a process similar to extrusion is utilised for a section of the fuselage. Cylinder arrays are attached to fuselage frames and arranged to face outwards over which enclosed 'C' sectioned fuselage skins are placed over the frame. This loose fitting assembly is then slid into an openable female tool. Once the assembly is disposed in the tool, then the cylinder arrays are activated as described above, and once the resin has cured then the finished section of the fuselage is pushed through by the introduction of the next loose fitting assembly and the process repeated continuously as part of an inline process. An advantage of this arrangement is that a full size tool would not be required and so the cost is reduced.

Although the above assembly and method of assembly is envisaged to be used with carbon fibre material components, it will be understood that the methodology is also applicable to an assembly and method of assembly using conventional metallic components.

It will be appreciated that the foregoing description is given by way of example only and that modifications may be made to the support assembly of the present invention without departing from the scope of the appended claims.

The invention claimed is:

1. A structural assembly for an aircraft comprising:
a cover having edges with outer and inner faces;
an inner support element; and
at least one extendable urging element located on the inner support element and configured to urge the cover to distend outwardly to a predetermined position, wherein opposing edges of the cover are fixedly mounted relative to the inner support element.

2. A structural assembly according to claim 1, wherein the at least one urging element is in an extended position when the at least one urging element acts on the inner face of the cover and the at least one urging element is configured to fixedly locate in said extended position.

3. A structural assembly according to claim 1, wherein the at least one urging element extends from said inner support element to act on the inner face of the cover.

4. A structural assembly according to claim 1, wherein the opposing edges of the cover are fixedly mounted to corresponding end support elements.

5. A structural assembly according to claim 4, wherein each end support element is mounted on the inner support element.

6. A structural assembly according to claim 5, wherein the at least one urging element comprises a first urging element and a second urging element, said second urging element is configured to act on each end support element to urge each end support element outwardly into a predetermined position.

7. A structural assembly according to claim 6, wherein the second urging element is configured to urge each end support element into communication with the corresponding opposing edge of the cover to fixedly mount the cover thereto.

8. A structural assembly according to claim 7, each opposing edge of the cover is turned back on itself along said each edge to form a recess.

9. A structural assembly according to claim 8, wherein each end support element has a flange extending along an edge to locate in said recess to fixedly mount the cover to said end support element.

10. A structural assembly according to claim 9, further comprising adhesive in said recess.

11. A structural assembly according to claim 4, wherein the end support elements are spars.

12. A structural assembly according to claim 1, wherein the inner support element is a rib.

13. A structural assembly according to claim 12, further comprising a plurality of ribs spaced from each other.

14. A structural assembly according to claim 4, further comprising two covers spaced from each other, with the inner support element disposed therebetween.

15. A structural assembly according to claim 14, wherein the end support elements extend between corresponding edges of the opposing covers.

16. A structural assembly according to claim 15, wherein the end support elements extend substantially transverse to the covers.

17. A structural assembly according to claim 14, further comprising two urging elements on opposite sides of the inner support element, so that each cover is urged to distend outwardly away from each other.

18. A structural assembly according to claim 1, wherein the panel is formed from cured carbon fibre.

19. A structural assembly according to claim 1 wherein the at one urging element fixedly mounts to the cover.

20. A structural assembly according to claim 1, wherein the at least one urging element comprises a plurality of urging elements spaced from each other along the inner support element.

21. A structural assembly according to claim 20, wherein each urging element comprises a body with a cylinder and a hydraulically activated piston slidably received in said cylinder which is urged from said cylinder and acts against the inner face of the cover to urge the cover to distend outwardly.

22. A structural assembly according to claim 21, wherein a hydraulic fluid is injected into the urging element to urge the piston against the inner face of the cover.

23. A structural assembly according to claim 22, wherein the hydraulic fluid is settable to fixedly locate the piston in an expanded position.

24. A structural assembly according to claim 21, wherein the urging elements are hydraulically connected in series so that each piston applies the same hydraulic pressure to the cover.

25. A structural assembly according to claim 6, wherein the second urging element comprises a plurality of second urging elements spaced from each other along the inner support element.

26. A structural assembly according to claim 25, wherein each second urging element comprises a body with a cylinder and a hydraulically activated piston slidably received in said cylinder which is urged from said cylinder and acts against said end support element.

27. A structural assembly according to claim 1, wherein the outer face of the cover forms an outer mould line of the structural assembly.

28. A wing box for an aircraft comprising a structural assembly according to claim 1.

29. A method of forming a structural assembly for an aircraft comprising an cover having edges with outer and inner faces, an inner support element and at least one extendable urging element located on the inner support element, the method comprising the steps of:
fixedly mounting opposing edges of the cover relative to the inner support element and operating the at least one urging element to act on the inner face of the cover so that the cover is urged to distend outwardly into a predetermined position.

30. A method according to claim 29, further comprising the step of fixing the at least one urging element in an extended position, so that the at least one urging element is acting on the inner face of the cover and the cover is distended outwardly in said predetermined position.

31. A method according to claim 30, further comprising the step of disposing the outer face of the cover on a mould tool which has a locating surface corresponding to a desired predetermined shape of the outer face of the cover so that, when the cover is urged to distend outwardly, the outer face of the cover abuts the locating surface and assumes said desired predetermined shape.

32. A method according to claim 31, further comprising the steps of:
mounting a removable tooling to mount the inner support element in spaced relation from said locating surface of the mould tool tooling through an aperture in the cover;
mounting the tooling to the mould tool; and
locating said inner support element to the tooling so that the inner support element and cover are disposed in a predetermined spaced relation to each other.

33. A method according to claim 29, further comprising the step of fixedly mounting an end support element to each opposing edge of the cover.

34. A method according to claim 33, further including the step of fixedly mounting each end support element to the inner support element to fixedly mount the opposing edges of the cover relative to the inner support element.

35. A method according to claim 34, wherein the at least one urging element is comprised of a first urging element and a second urging element, both mounted on the inner support element, the method further comprises the step of the first and second urging elements acting on each end support element and urging each end support element outwardly into a predetermined position to fixedly mount said each end support element to each opposing edge of the cover.

36. A method according to claim 33, wherein the structural assembly includes two covers, and the method further comprises the steps of:

locating the covers in spaced relation to each other with the inner support element disposed therebetween;

fixedly mounting opposing edges of each cover to the end support element so that said each end support element extends between the two covers; and operating the at least one urging element to act on the inner face of each cover so that the covers are urged to distend outwardly away from each other into predetermined positions.

37. A method according to claim 36, further comprising the step of disposing the outer face of each cover to face a corresponding mould tool which has a locating surface corresponding to a desired predetermined shape of the outer face of each cover wherein each cover is urged to distend outwardly, the outer face of each cover abuts the locating surface, and the outer surface of each cover assumes said desired predetermined shape.

38. A method according to claim 37, further comprising the steps of:

mounting a removable tooling to one of said mould tools to mount the inner support element through an aperture in the cover in spaced relation from said locating surface of each mould tool;

mounting the tooling to the mould tool; and locating said inner support element to the tooling so that the inner support element and cover are disposed in a predetermined spaced relation to each other and a uniform pressure is applied to both covers by the urging means.

39. A structural assembly for an aircraft comprising:

a cover having edges with outer and inner faces;

an inner support element; and extendable urging means, located on the inner support element, for urging the cover to distend outwardly to a predetermined position, wherein opposing edges of the cover are fixedly mounted relative to the inner support element.

\* \* \* \* \*